United States Patent
Aoba et al.

(10) Patent No.: US 10,929,978 B2
(45) Date of Patent: Feb. 23, 2021

(54) IMAGE PROCESSING APPARATUS, TRAINING APPARATUS, IMAGE PROCESSING METHOD, TRAINING METHOD, AND STORAGE MEDIUM

(71) Applicant: CANON KABUSHIKI KAISHA, Tokyo (JP)

(72) Inventors: Masato Aoba, Tokyo (JP); Koichi Magai, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 67 days.

(21) Appl. No.: 16/022,975

(22) Filed: Jun. 29, 2018

(65) Prior Publication Data
US 2019/0012790 A1 Jan. 10, 2019

(30) Foreign Application Priority Data
Jul. 5, 2017 (JP) ................. 2017-132259

(51) Int. Cl.
*G06T 7/11* (2017.01)
*G06K 9/62* (2006.01)
*G06K 9/66* (2006.01)
*G06T 7/12* (2017.01)

(52) U.S. Cl.
CPC ............. *G06T 7/11* (2017.01); *G06K 9/6202* (2013.01); *G06K 9/628* (2013.01); *G06K 9/6231* (2013.01); *G06K 9/6269* (2013.01); *G06K 9/6273* (2013.01); *G06K 9/66* (2013.01); *G06T 7/12* (2017.01); *G06K 2209/21* (2013.01); *G06T 2207/10024* (2013.01); *G06T 2207/20021* (2013.01); *G06T 2207/20081* (2013.01); *G06T 2207/20084* (2013.01); *G06T 2207/30201* (2013.01)

(58) Field of Classification Search
CPC ... G06T 7/11; G06T 11/60; G06T 7/60; G06T 3/40; G06T 2207/10024; G06T 7/0012; G06T 2207/10004; G06T 2207/10081; G06T 2207/30004; G06T 2207/30096; G06T 2207/30176; G06T 3/0093; G06T 7/12; G06T 7/187; G06T 7/50; G06T 7/64; G06T 7/75; G06T 11/00; G06T 2200/24
USPC ........................................... 382/103
See application file for complete search history.

(56) References Cited

U.S. PATENT DOCUMENTS

| | | |
|---|---|---|
| 8,526,679 B2 | 9/2013 | Saruta et al. |
| 2008/0279427 A1 | 11/2008 | Takagi |
| 2013/0142401 A1* | 6/2013 | Nomoto ............... G06K 9/6267 382/118 |
| 2015/0109474 A1* | 4/2015 | Saruta ................. G06K 9/00664 348/222.1 |

(Continued)

OTHER PUBLICATIONS

Alex Krizhevsky, et al., "ImageNet Classification with Deep Convolutional Neural Networks", Proc. Advances in Neural Information Processing Systems 25 (NIPS 2012), pp. 1-9.

(Continued)

*Primary Examiner* — Ajibola A Akinyemi
(74) *Attorney, Agent, or Firm* — Venable LLP

(57) ABSTRACT

There is provided with an image processing apparatus, for example, for image recognition. An extraction unit extracts a feature amount from a target image. An estimation unit estimates distribution of regions having attributes different from each other in the target image based on the feature amount.

17 Claims, 12 Drawing Sheets

(56) References Cited

U.S. PATENT DOCUMENTS

2015/0156484 A1 6/2015 Takahama
2015/0326752 A1* 11/2015 Hayasaki ................ G06T 5/008
  358/522

OTHER PUBLICATIONS

Radhakrishna Achanta, et al., "SLIC Superpixels", EPFL Technical Report 149300, 2010, pp. 1-15.
Jonathan Long, et al., "Fully Convolutional Networks for Semantic Segmentation", The IEEE Conference on Computer Vision and Pattern Recognition (CVPR), 2015, pp. 1-10.

* cited by examiner

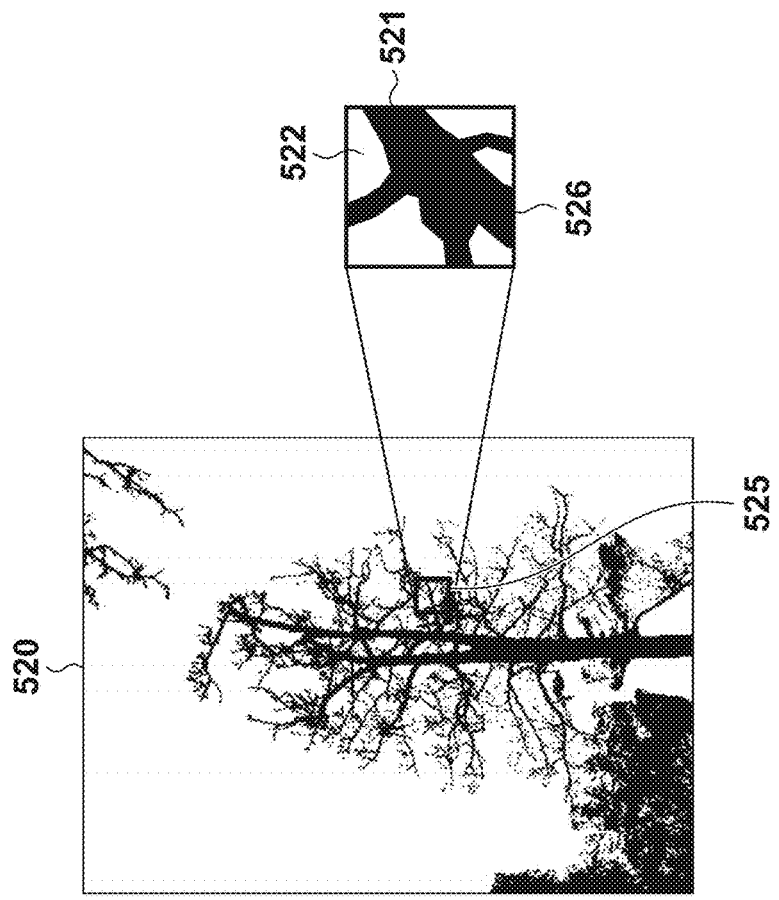
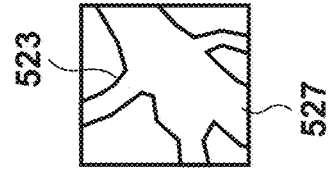
FIG. 4A
FIG. 4B
FIG. 4C

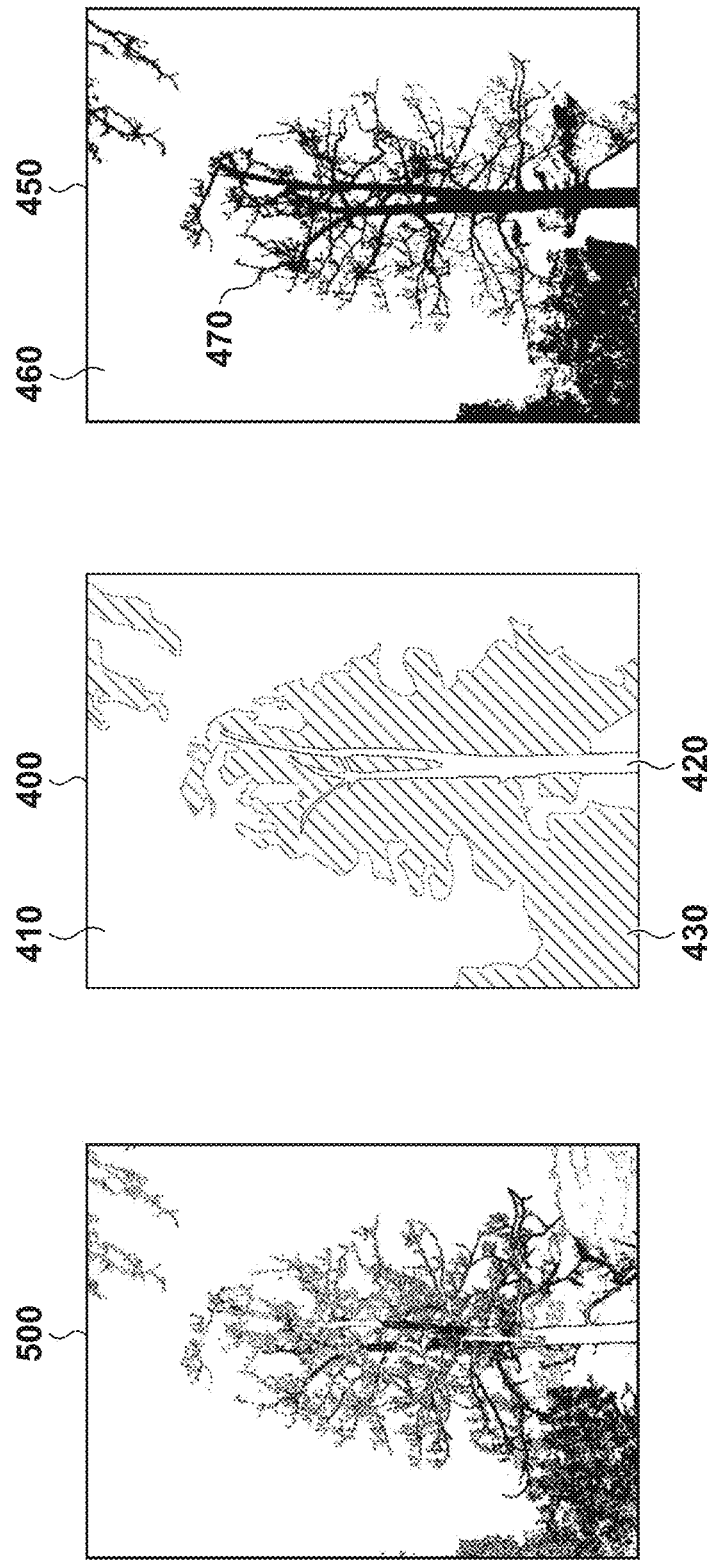

IMAGE PROCESSING APPARATUS, TRAINING APPARATUS, IMAGE PROCESSING METHOD, TRAINING METHOD, AND STORAGE MEDIUM

BACKGROUND OF THE INVENTION

Field of the Invention

The present invention relates to an image processing apparatus, a training apparatus, an image processing method, a training method, and a storage medium, and more particularly to image recognition, for example.

Description of the Related Art

In recent years, studies on region segmentation of images have widely been conducted. For example, the region of a person, the region of an automobile, the region of a road, the region of a building, the region of sky, or the like can be segmented from an image. This is called semantic segmentation, and a segmentation result can be applied to, for example, image correction or scene interpretation corresponding to the type of an object.

As a semantic segmentation method, there exists a method of segmenting an image into several regions in advance and classifying segmented regions into classes. For example, it is possible to segment an image into a plurality of rectangular blocks and classify each block into a class. As for the method of classifying an image, studies on classification using deep learning as described in Krizhevsky (A. Krizhevsky et al. "ImageNet Classification with Deep Convolutional Neural Networks", Proc. Advances in Neural Information Processing Systems 25 (NIPS 2012)) have widely been carried out. It is also possible to segment an image into small regions (superpixels) in indeterminate forms using a method described in, for example, Achanta (R. Achanta et al. "SLIC Superpixels", EPFL Technical Report 149300, 2010) and classify each region into a class using the feature amount of the region and the context feature amount on the periphery of the region. An estimator trained using a training image can be used for class classification.

Region segmentation using deep learning has also been studied in recent years. In Long (J. Long et al. "Fully Convolutional Networks for Semantic Segmentation", The IEEE Conference on Computer Vision and Pattern Recognition (CVPR) 2015), an intermediate layer output of a CNN (Convolutional Neural Network) is used as a feature amount, and class determination results of pixels based on a plurality of intermediate layer features are integrated. In this method, the class of each pixel can directly be determined without using small region segmentation results.

SUMMARY OF THE INVENTION

According to an embodiment of the present invention, an image processing apparatus comprises: an extraction unit configured to extract a feature amount from a target image; and an estimation unit configured to estimate distribution of regions having attributes different from each other in the target image based on the feature amount.

According to another embodiment of the present invention, a training apparatus comprises: an extraction unit configured to extract a feature amount of an identified image for training of an estimator; an obtaining unit configured to obtain, as supervisory information, distribution-related information which relates to distribution of regions having attributes different from each other in the identified image; and a training unit configured to perform the training of the estimator using a combination of the feature amount of the identified image and the supervisory information, wherein the estimator is trained to estimate the distribution from the feature amount.

According to still another embodiment of the present invention, an image processing method comprises: extracting a feature amount from a target image; and estimating distribution of regions having attributes different from each other in the target image based on the feature amount.

According to yet another embodiment of the present invention, a training method comprises: extracting a feature amount of an identified image for training of an estimator; obtaining, as supervisory information, distribution-related information which relates to distribution of regions having attributes different from each other in the identified image; and performing the training of the estimator using a combination of the feature amount of the identified image and the supervisory information, wherein the estimator is trained to estimate the distribution from the feature amount.

According to still yet another embodiment of the present invention, a non-transitory computer-readable medium stores a program which causes a computer having a processor and a memory to: extract a feature amount from a target image; and estimate distribution of regions having attributes different from each other in the target image based on the feature amount.

According to yet still another embodiment of the present invention, a non-transitory computer-readable medium stores a program which causes a computer having a processor and a memory to: extract a feature amount of an identified image for training of an estimator; obtain, as supervisory information, distribution-related information which relates to distribution of regions having attributes different from each other in the identified image; and perform the training of the estimator using a combination of the feature amount of the identified image and the supervisory information, wherein the estimator is trained to estimate the distribution from the feature amount.

Further features of the present invention will become apparent from the following description of exemplary embodiments (with reference to the attached drawings).

BRIEF DESCRIPTION OF THE DRAWINGS

FIGS. 4A to 4C are views for explaining a class label and a distribution at the time of 2-class identification;

FIGS. 9A to 9C are views for explaining class label detailing in a mixture region.

DESCRIPTION OF THE EMBODIMENTS

According to the conventional method, each small region on an image can be classified into a class based on the type of an object. For example, it can be determined, based on the feature amount of each region, whether a region is a region representing sky or the region of foreground (other than sky). On the other hand, it is difficult to perform appropriate determination for a region in which different types of objects are mixed. For example, when performing the determination for a plurality of regions in which the sky is visible through the gaps between many branches of a tree, all regions are determined as the foreground or all regions are determined as the sky at a high possibility because they have similar textures.

In an embodiment of the present invention, class classification of each region of an image is performed so as to improve the accuracy of processing using a classification result.

According to an embodiment of the present invention, it is possible to estimate how a plurality of classes are mixed (hereinafter referred to as distribution of classes (or regions, portions, etc.)) in a predetermined region serving as an identification unit on an input image. The image in a region that is an estimation target will sometimes be referred to as a target image hereinafter. More specifically, according to an embodiment of the present invention, the distribution of regions having attributes different from each other in a target image is determined. Regions of each attribute are regions occupied by objects belonging to the same class. That is, one of the regions of the attributes is a region of an object belonging to a specific class, and another one of the regions of the attributes is a region of an object belonging to a class different from the specific class.

According to an embodiment, for a region in which, for example, the sky is visible through the gaps between many branches of a tree (foreground), the distribution (for example, the area ratio, the edge area, the arrangement pattern, or the like) of a foreground portion and a sky portion can be estimated. By using not only class information (for example, information representing whether a region is a foreground region or a sky region) of each region that can be obtained by the conventional method but also such distribution-related information, the accuracy of processing performed for the image later can be improved. Detailed examples will be described in each embodiment.

The embodiments of the present invention will now be described based on the drawings. However, the scope of the present invention is not limited to the following embodiments. In the following embodiments, each processing unit shown in FIGS. 1A to 1F and the like may be implemented by a computer or may be implemented by dedicated hardware.

Figure 10:
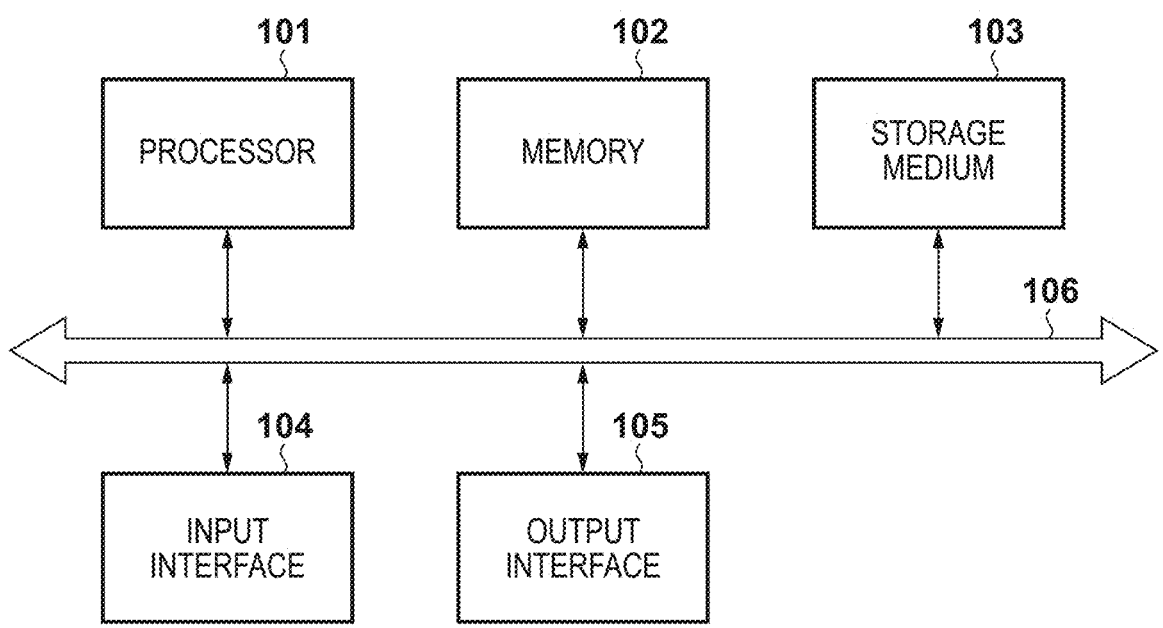
FIG. 10 is a block diagram showing an example of the arrangement of a computer capable of implementing each embodiment.

FIG. 10 is a block diagram showing the basic arrangement of a computer capable of implementing each embodiment. Referring to FIG. 10, a processor 101 is, for example, a CPU and controls the operation of the entire computer. A memory 102 is, for example, a RAM and temporarily stores programs, data, and the like. A computer-readable storage medium 103 is, for example, a hard disk, a CD-ROM, or the like and stores programs and data for a long time. In this embodiment, a program stored in the storage medium 103 and configured to implement the function of each unit is read out to the memory 102. Then, the processor 101 operates in accordance with the program on the memory 102, thereby implementing the function of each unit.

Referring to FIG. 10, an input interface 104 is an interface used to obtain information from an external apparatus. In addition, an output interface 105 is an interface used to output information to an external apparatus. A bus 106 connects the above-described units and allows them to exchange data.

First Embodiment

Figure 1A:
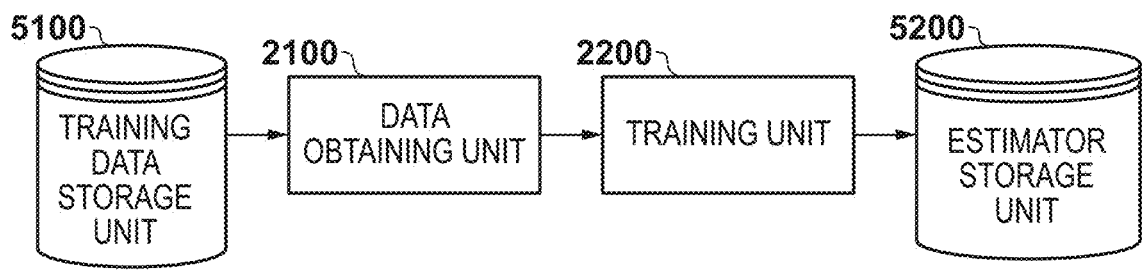
FIGS. 1A to 1F are block diagrams showing examples of the arrangements of apparatuses according to the embodiments.
Figure 1B:
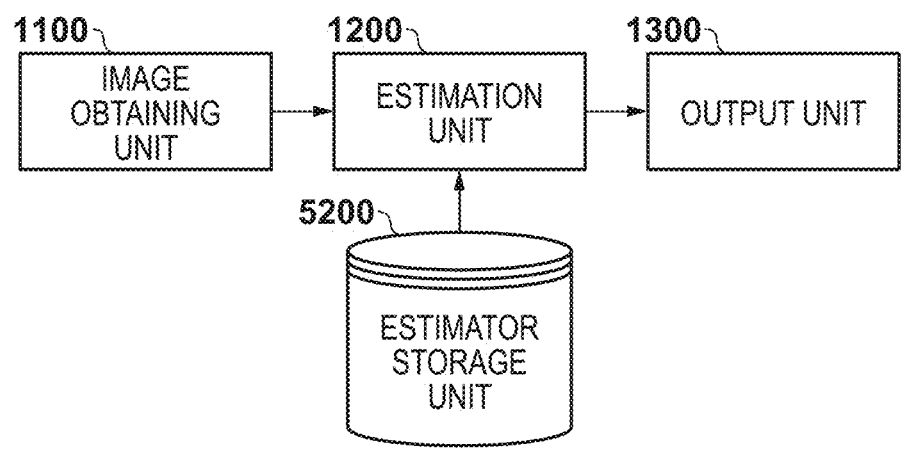

The basic arrangements of an image processing apparatus and a training apparatus according to the first embodiment will be described with reference to FIGS. 1A and 1B.

The outline of the device arrangement of the training apparatus will be described first with reference to FIG. 1A. In this embodiment, the training apparatus generates, from a training image prepared in advance, an estimator used by the image processing apparatus to be described later to perform processing of recognizing a distribution. Details of training processing will be described later. A training data storage unit 5100 stores training data prepared in advance. The training data includes a training image and supervisory information. A data obtaining unit 2100 obtains the training image and the supervisory information from the training data storage unit 5100. Using a feature extraction unit 610, a training unit 2200 extracts the feature amount of an identified image that is located in a predetermined region of the training image and used for training of the estimator. In addition, the training unit 2200 performs training of the estimator that estimates the distribution from the feature amount using the combination of the feature amount of the identified image and the supervisory information. For example, the training unit 2200 can perform training of the estimator that outputs distribution-related information when a feature amount is input. Here, the supervisory information is the distribution-related information between regions of attributes different from each other in the identified image. The estimator obtained by the training is stored in an estimator storage unit 5200. More specifically, the estimator storage unit 5200 can store the parameters of the estimator decided by the training.

The outline of the device arrangement of the image processing apparatus will be described next with reference to FIG. 1B. In this embodiment, the image processing apparatus performs processing of estimating a distribution in an unknown input image. Details of processing contents will be described later. An image obtaining unit 1100 obtains an input image. Using the feature extraction unit 610, an estimation unit 1200 extracts a feature amount from a target image that is a distribution identification target located in a predetermined region of the input image. The feature extraction unit 610 used by the estimation unit 1200 can operate like the feature extraction unit 610 used by the training unit 2200. Additionally, based on the feature amount, the estimation unit 1200 estimates the distribution of regions having attributes different from each other in the target image. For example, the estimation unit 1200 loads an estimator 620 trained in advance from the estimator storage unit 5200 and outputs, to an output unit 1300, distribution-related information between the regions of attributes different from each other in the target image, which is obtained by inputting a feature amount to the estimator. The estimator 620 can be an estimator obtained by training of the training unit 2200. The output unit 1300 outputs the estimation result of the estimation unit 1200.

The data obtaining unit 2100 and the training unit 2200 of the training apparatus may be implemented on the same computer, may be formed as independent modules, or may be implemented as programs that operate on the computer. The training data storage unit 5100 and the estimator storage unit 5200 of the training apparatus can be implemented using a storage provided in or outside the computer.

The image obtaining unit 1100 and the estimation unit 1200 of the image processing apparatus may be implemented on the same computer, may be formed as independent modules, or may be implemented as programs that operate on the computer. Alternatively, these may be implemented as circuits or programs in an image capturing apparatus such as a camera.

The image processing apparatus may be implemented on the same computer as the training apparatus, or they may be implemented on different computers. The estimator storage units 5200 provided in the training apparatus and the image processing apparatus may be the same storage or may be different storages. When different storages are used, the estimator stored in the estimator storage unit 5200 by the training apparatus can be copied or moved to the estimator storage unit 5200 provided in the image processing apparatus.

Processing according to this embodiment will be described below in detail. First, processing at the time of training performed by the training apparatus will be described with reference to the procedure shown in FIG. 2A. In step S2100, the data obtaining unit 2100 obtains a training image and supervisory information of a distribution from the training data storage unit 5100 as training data.

A plurality of training images and supervisory information of distributions are stored in advance in the training data storage unit 5100. The training image indicates an image used for training of the estimator. The training image can be, for example, image data captured by a digital camera or the like. The format of the image data is not particularly limited and can be, for example, JPEG, PNG, BMP, or the like. The number of training images prepared is represented by N, and the nth training image is represented by $I_n$ (n=1, . . . N) below.

The supervisory information of a distribution indicates a distribution in a predetermined region of the training image. The supervisory information is prepared in advance and, for example, a human can create it while viewing the training image. In this embodiment, a plurality of regions each serving as an identification unit are set in the training image, and supervisory information is prepared for each region. The image in the predetermined region of the training image, which is one identification unit, will be referred to as an identified image hereinafter.

The region setting method is not particularly limited. For example, a plurality of regions can be set in an input image in accordance with a predetermined region setting pattern. As a detailed example, the training image can be segmented into a plurality of rectangular regions each having a predetermined size (for example, 16×16 pixels), and each rectangular region can be handled as an identification unit. Alternatively, a small region obtained by the method described in non-patent literature 2 can be handled as an identification unit. On the other hand, a rectangular region of a predetermined size may be set only in part of the training image. Note that an identified image of a predetermined size may be stored in the training data storage unit 5100 as training data.

Figure 3A:
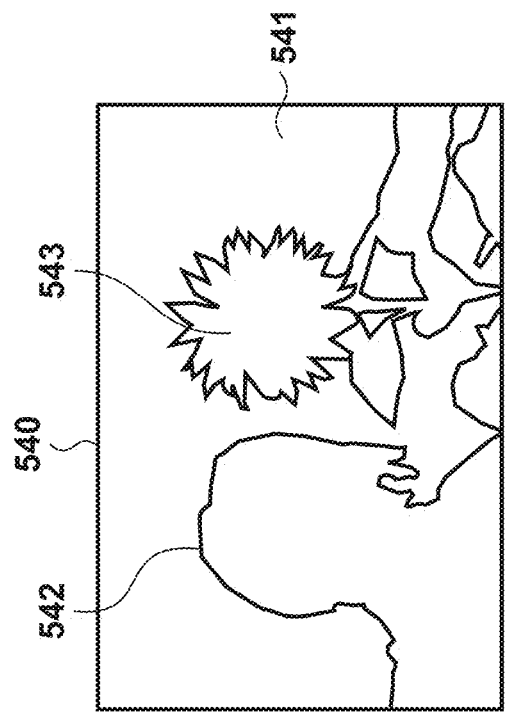
FIGS. 3A to 3D are views for explaining training images and class labels.
Figure 3B:
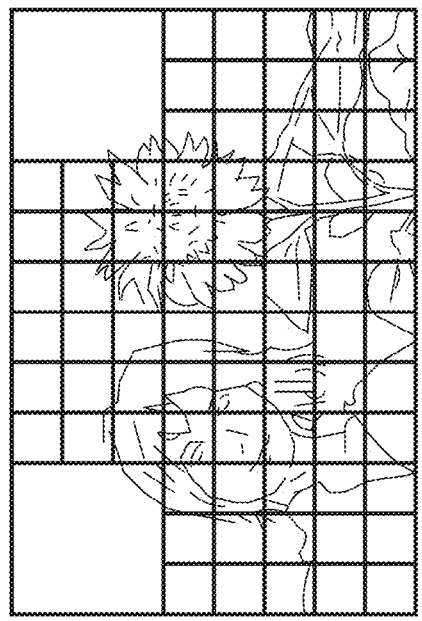

A distribution represented by supervisory information will be described below. Objects on an image can be classified into a plurality of classes. FIGS. 3A and 3B show an example of such class classification. FIG. 3A shows an example of a training image 500. The training image 500 includes the sky, a person, and a plant, and they can be classified into different classes. That is, as shown in FIG. 3B, pixels included in a region 541 can be given a class label "sky", pixels included in a region 542 can be given a class label "person", and pixels included in a region 543 can be given a class label "plant".

Classes and class labels are defined variously, and the class classification method is not particularly limited. In the example shown in FIGS. 3A and 3B, class classification is performed in accordance with the types of the objects. Other examples of class labels are a skin region, a hair region, animals such as a dog and a cat, and artifacts such as an automobile and a building. A class label representing a specific object such as a component A or a component B used in a factory can also be used. On the other hand, the pixels may be classified into main object regions and a background region. Otherwise, class classification may be done based on the difference in the surface shape such as a glossy surface or a matte surface or the difference in the material such as a metal surface or a plastic surface. Assume that there exist M class types in total.

The distribution of classes indicates the distribution between regions of attributes different from each other in the target image. The region of each attribute is a region occupied by an object belonging to the same class. One of regions of attributes different from each other is a region of an object belonging to a specific class, and the other region is a region of an object belonging to a class different from the specific class. The region of an attribute occupied by an object belonging to a given class will be sometimes simply referred to as a region belonging to the class hereinafter. In addition, the class of an object included in each pixel will sometimes be referred to as the attribute or class of the pixel hereinafter.

Various definitions of the distribution can be considered. In this embodiment, the distribution is represented by a numerical value in the following way. In an embodiment, distribution-related information is information determined depending on the distribution of regions of attributes in a target image. For example, distribution-related information is information representing the ratio of each of regions of attributes in a target image. As a detailed example, distribution-related information can be the area ratio of regions belonging to the respective classes in a target image. A case in which there are two classes "sky" and "non-sky" will be described with reference to an example shown in FIGS. 4A to 4C. FIGS. 4A and 4B show a training image 510 and a class label 520 thereof, respectively. The class label 520 represents a pixel whose class is "sky" by white and a pixel whose class is "non-sky" by black. FIG. 4B shows an enlarged view 526 that enlarges a region 525 on the class label 520 corresponding to an identified image 515 in the training image 510. The enlarged view 526 shows a non-sky region 521 and a sky region 522. At this time, the distribution of the identified image 515 can be represented by an area ratio r of the sky region and the non-sky region in the corresponding region 525. For example, if the number of sky region pixels is 192, and the number of non-sky region pixels is 64 in the rectangular region of 16×16 pixels, r=192/256=0.75.

Figure 5:
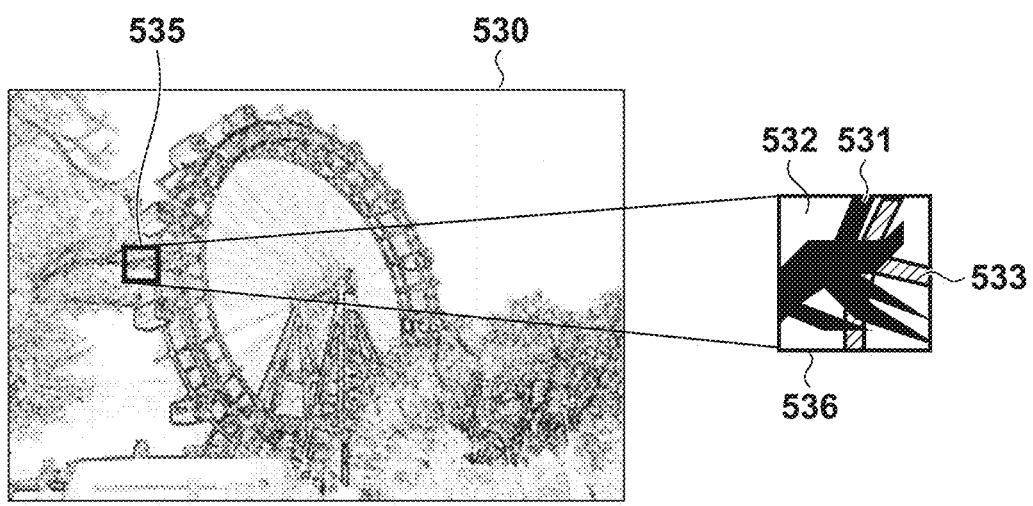
FIG. 5 is a view for explaining a class label and a distribution at the time of 3-class identification.
Figure 6A:
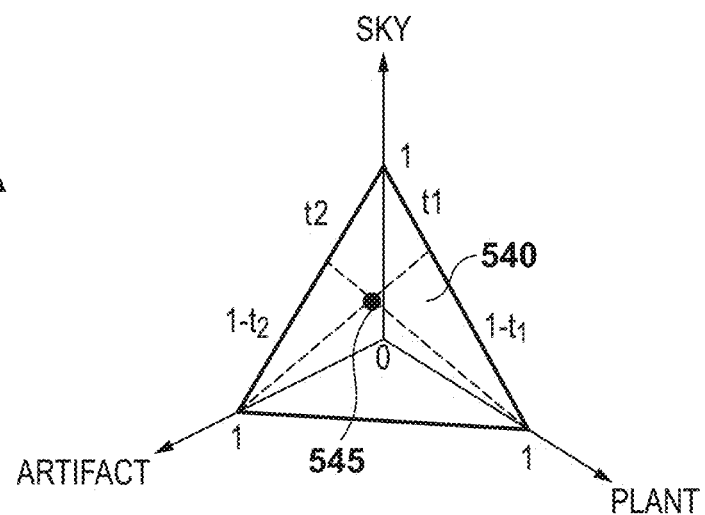
FIGS. 6A to 6C are views for explaining the distribution at the time of 3-class identification.

In the above example, the area ratio of two classes has been described. The area ratio of three or more classes can also be represented. FIG. 5 shows a training image 530, an identified image 535 in the training image 530, and a class label 536 for the identified image 535. In this example, the pixels of the training image 530 are classified into three classes "sky", "plant", and "artifact". The distribution in this case can be defined in accordance with the area ratio of a plant region 531, a sky region 532, and an artifact region 533. As an example, a point 545 representing the area ratio in this case can be plotted on a simplex 540 (a triangle in the case of FIG. 5) in a coordinate space shown in FIG. 6A in accordance with the area ratio of the classes. Since the point 545 can uniquely be represented using internal ratios $t_1$ and $t_2$ that internally divide two sides of the simplex, the area ratio at this time can be expressed as a vector $r=(t_1, t_2)$. This also applies to general M dimensions and, therefore, the area ratio in a case in which the number of classes is M can uniquely be represented by an (M−1)-dimensional vector $r=(t_1, t_2, \ldots, t_{M-1})$. Note that the area ratio in the case of two classes as described above is the same value as in a case in which M=2 is set in the generalized form.

Figure 6B:
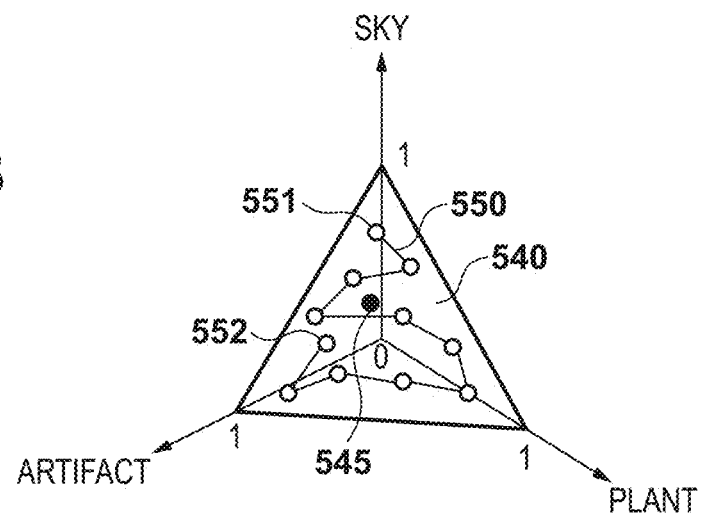
Figure 6C:
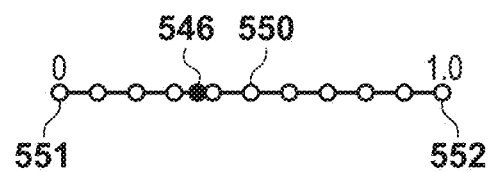

In addition, the area ratio of M classes represented in the above-described way may be handled by mapping it on a lower-order space. For example, the area ratio in the identified image can be plotted on an M-dimensional space and mapped on a lower-order space using SOM (Self-Organizing Map) or LLE (Locally Linear Embedding). FIG. 6B shows an example in which the above-described space of the distribution ratio of the three classes is quantized using a one-dimensional SOM 550. Reference numeral 551 denotes a start terminal node of the SOM 550; and 552, an end terminal node of the SOM 550. FIG. 6C is obtained by mapping them on a one-dimensional space. The start terminal node is located at position 0, and the end terminal node is located at position 1. When the nodes are evenly arranged, the point 545 representing the area ratio can be expressed as a scalar value representing a position on the map. For example, the point 545 representing the area ratio in FIG. 6B can be approximated as a point 546 in FIG. 6C. The area ratio can be represented using the position (in this example, r=0.37) of the point 546 on the map. The number of dimensions after mapping is not limited to one as shown in FIG. 6C. In general, when the value M is large, approximation can be performed using a SOM of one or more dimensions R. In this case, r can be expressed as an R-dimensional vector. For example, if the number of classes is M=5, and the area ratio space is quantized using a two-dimensional SOM, r can be expressed as a two-dimensional vector.

In addition, the area ratio of M classes may be expressed as the composite vector of a plurality of basic vectors. For example, a class area ratio obtained from various identified images is decomposed into a plurality of basic vectors using principal component analysis, sparse coding, or the like. They can be approximated by a small number of vectors of large degrees of contribution. In this case, the area ratio in the area ratio space can be expressed as the composite vector of these basic vectors. The area ratio can be represented using a weight coefficient for each basic vector at that time.

As another example, distribution-related information can be information concerning the boundary between regions of attributes different from each other in a target image, for example, information representing the ratio of pixels representing the boundary in the target image. As an example, edge detection is performed for a binary image representing a class (for example, a sky region or a non-sky region) of pixels, and the number of obtained edge pixels is counted. The distribution can be represented using a ratio e of the number of pixels in a predetermined region and the number of edge pixels. FIG. 4C shows an edge detection result 527 for the class label 526, and detected edge pixels 523 are shown. If the count result of edge pixels in the rectangular region of 16×16 pixels is 64, the edge pixel ratio can be expressed as e=64/256=0.25.

As still another example, distribution-related information can be information representing the arrangement of a region of an attribute in a target image. For example, the distribution can be represented in accordance with the arrangement pattern of the pixels of the classes in the predetermined region. If the number of pixels is M, and the number of pixels in the predetermined region is K, the class of each pixel in the predetermined region can be represented by an (M×K)th-dimensional binary vector. For example, when two classes "sky" and "non-sky" are defined, and the size of the predetermined region is 16×16 pixels, the class label arrangement pattern in the predetermined region can be expressed as a 2×16×16=512-dimensional binary vector. Various binary vectors thus obtained from the identified image are plotted on a vector space and quantized using SOM, LLE, or the like, thereby expressing the class label arrangement pattern in the predetermined region as a vector p. Alternatively, it is also possible to use a method of expressing various binary vectors obtained from the identified image as basic vectors using principal component analysis, sparse coding, or the like.

Figure 7:
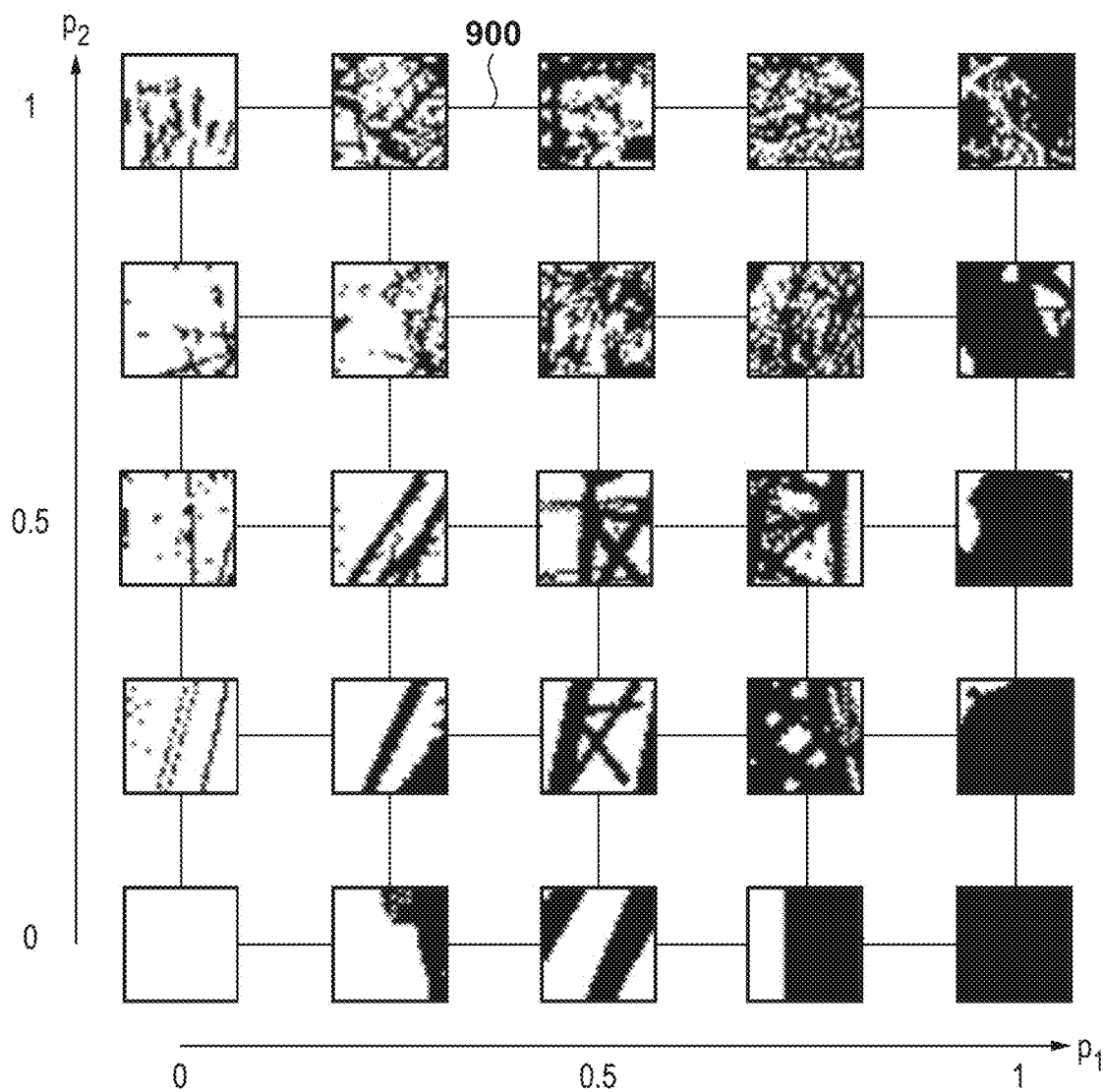
FIG. 7 is an explanatory view of mapping of a distribution.

FIG. 7 shows a map 900 obtained by mapping a class label arrangement pattern in a predetermined region using a two-dimensional SOM. In the map 900, each rectangle is a node of the SOM and represents a quantized class label arrangement pattern. According to the characteristic of the SOM, similar patterns are arranged at close positions on the map. The class label arrangement pattern in the identified image can be represented by position coordinates p on the map based on the closeness to the pattern of each node. For example, in the example of the two-dimensional SOM shown in FIG. 7, a position on the map can be expressed as a two-dimensional vector $p=(p_1, p_2)$.

As described above, the distribution can be expressed using various methods. The distribution may be expressed using any one of these expressions. For example, if the distribution is represented only by the area ratio, it is defined as C=r. If the distribution is represented only by the edge pixel ratio, it is expressed as C=e. If the distribution is represented only by the class label arrangement pattern, it is defined as C=p. In addition, the distribution may be expressed by combining a plurality of expressions. For example, the distribution may be defined as C=(r, e) that is the combination of the area ratio and the edge pixel ratio, or may be defined a C=(r, e, p) that is the combination of the area ratio, the edge pixel ratio, and the class label arrangement pattern. In the present invention, the distribution expression method is not particularly limited.

As described above, the distribution C can be expressed as a vector represented by one or more numerical values. That is, it can be considered that distribution-related information obtained in an embodiment is a feature amount representing a distribution in a predetermined region. Let L be the number of dimensions of the vector representing the distribution C. A distribution vector in a predetermined region i on an image $I_n$ is expressed as $C_{ni}$, and the lth (l=1, . . . , L) element of the distribution vector $C_{ni}$ is expressed as c(n, i, l). Note that the distribution may represent not only how the pixels of classes are mixed in the predetermined region but also that the predetermined region is formed by the pixels of one specific class.

In this embodiment, assume that each pixel of each training image is given a class label, as shown in FIG. 3B. Also assume that based on the class labels, the distribution C represented by a scalar value or a vector value in the above-described way is calculated in advance as supervisory information for each identified image obtained for the training images and stored in advance in the training data storage unit 5100. However, the data obtaining unit 2100 may obtain the supervisory information by obtaining information representing the attribute of each pixel of the identified image and generating distribution-related information using the information representing the attribute of each pixel. For example, the data obtaining unit 2100 can calculate the distribution C of each identified image in the above-described way based on the class label of each pixel of training images stored in the training data storage unit 5100. In addition, it is not essential that each pixel of each training image is given a class label, as shown in FIG. 3B. For example, the distribution of an identified image input by an operator while viewing the identified image obtained from a training image or the distribution of the identified image automatically calculated based on information (for example, edge information) input by the operator may be stored in advance in the training data storage unit 5100.

In step S2200, the training unit 2200 obtains the identified image and the supervisory information of the distribution from the data obtaining unit 2100 and performs training of an estimator that estimates the distribution. A case in which a CNN (Convolutional Neural Network) is used as an estimator will be described below. As the arrangement of the CNN, a conventionally known arrangement can be used. The CNN is typically a neural network that gradually compiles the local features of input signals by repeating a convolutional layer and a pooling layer and obtains a robust feature for a deformation or a positional shift, thereby performing a recognition task.

Figure 8A:
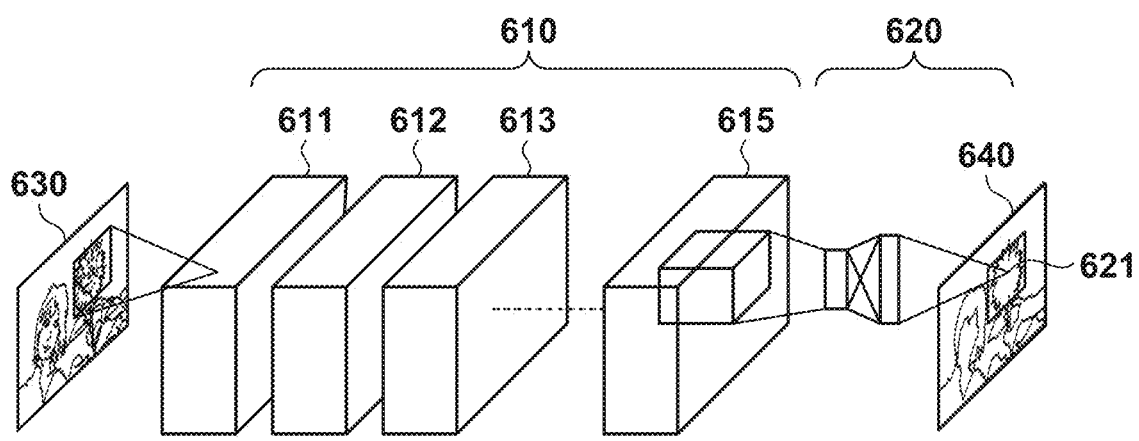
FIGS. 8A and 8B are views showing examples of the arrangement of a training unit or an estimation unit according to the embodiments.

An example of estimation processing using the CNN will be described with reference to FIG. 8A. The training unit 2200 extracts the feature amount of an identified image used for training of the estimator using the feature extraction unit 610. In addition, the training unit 2200 performs training of the estimator that outputs distribution-related information when a feature amount is input using the combination of the feature amount of the identified image and supervisory information. FIG. 8A shows an example of a CNN usable by the training unit 2200 for the processing. FIG. 8A shows a portion corresponding to processing performed by the feature extraction unit 610, which corresponds to the convolutional layer of CNN for performing feature extraction. In addition, FIG. 8A shows a portion corresponding to the estimator 620 to be trained, which corresponds to the fully connected layer of CNN for performing pattern estimation.

The convolutional layer includes an input layer 611 that receives, as a signal, a convolution operation result at each position of an identified image 630 that is a partial image of the training image. The signal from the input layer 611 is sent to a final layer 615 via a plurality of intermediate layers 612 and 613 in which the convolutional layer and the pooling layer are arranged, and the convolution operation and signal selection by pooling are repeated. The output signal from the final layer 615 of the feature extraction unit 610 is sent to the estimator 620. Let X be the output signal of the feature extraction unit 610. In the fully connected layer, the element of each layer is totally connected to the preceding and succeeding layers, and the signal input from the feature extraction unit 610 is sent to an output layer 640 via a product-sum operation using a weight coefficient. The output layer 640 includes as many output elements as the number L of dimensions of the distribution vector C.

When performing training of the estimator, the training unit 2200 compares the value of the output signal obtained by the output layer 640 with the supervisory information when the identified image obtained from the predetermined region i of the training image In is input to the CNN. Here, let $X^n_i$ be the feature amount obtained by inputting the predetermined region i of the training image $I_n$ to the feature extraction unit 610 and $y_l(X^n_i)$ be the output signal of the lth output element of the output layer 640 obtained as the result of inputting the feature amount to the estimator 620. In addition, the supervisory signal in the lth output element of the output layer 640 is represented by the lth element c(n, i, l) of the distribution $C_{ni}$. In this case, the error between the output signal and the supervisory information is calculated by $$E_{(n,i,l)} = (y_l(X^n_i) - c(n,i,l))^2$$

When the thus obtained error is sequentially back-propagated from the output layer to the input layer using back-propagation, training of the CNN can be performed. For example, the weight coefficient of each layer in the CNN can be updated using stochastic gradient descent or the like. As the initial value of the weight coefficient of the CNN, a random value can be used, or a weight coefficient obtained by training concerning a certain task may be used. For example, in an image classification task, training images in which a class label is given on an image basis are used. However, in a region segmentation task, training images in which a class label is given on a pixel basis are used. For this reason, a load on a human to prepare the training images for the region segmentation task is large. On the other hand, training images for the image classification task are open to the public and are easily available. For example, in ILSVRC (ImageNet Large-scale Visual Recognition Challenge), 1,200,000 training images for the image classification task are made open to the public. Hence, training of the CNN may be performed for such an image classification task, and training for a distribution estimation task as in this embodiment may be performed using a weight coefficient obtained by the training as the initial value.

Figure 8B:
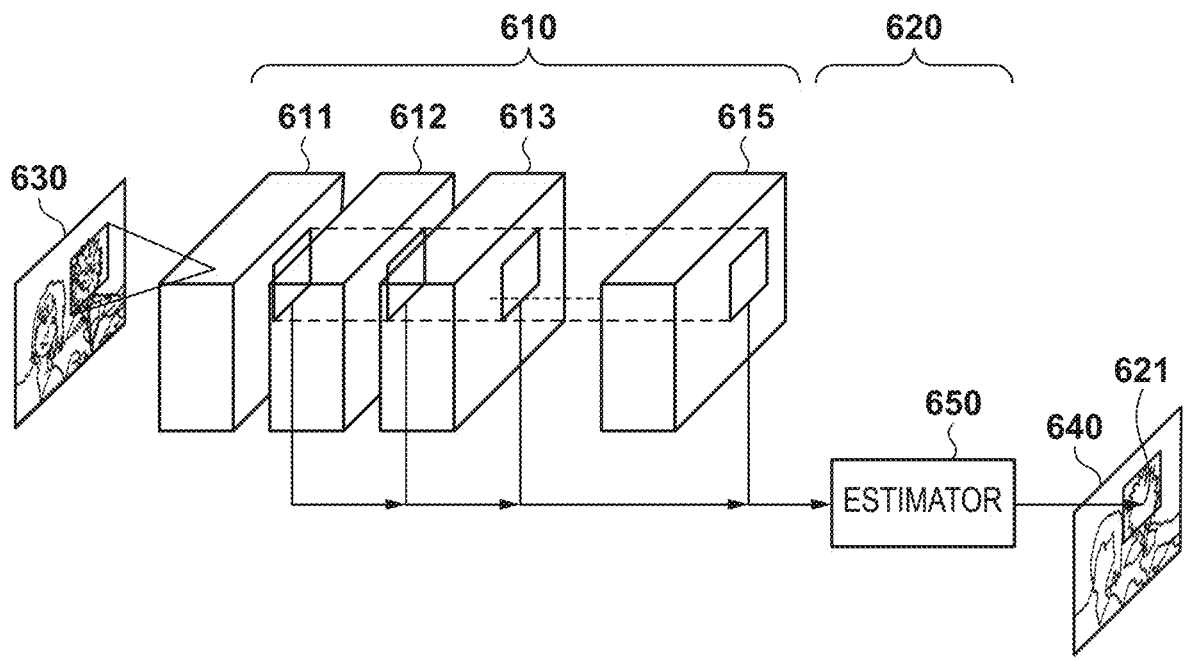

The estimator using the CNN has been described here. However, the arrangement of the estimator is not particularly limited. FIG. 8B shows another example of the arrangement usable by the estimation unit 1200 for processing. FIG. 8B shows a portion corresponding to processing performed by the feature extraction unit 610 and a portion corresponding to processing performed by an estimator 650. The estimator 650 gives a regression value to one feature amount obtained by connecting the output signals of the respective layers in the feature extraction unit 610. As a method used by the estimator 650, for example, SVR (Support Vector Regression), logistic regression, or the like can be used. However, the method is not particularly limited. Using the training images, training of a regression function used by the estimator 650 can be performed. For example, training of the regression function can be performed so as to minimize an error function based on the error between the output signal and the supervisory information. Alternatively, training of the CNN may be performed in advance using an arrangement as shown in FIG. 8A, and after that, training of only the estimator 650 may be performed using a feature amount based on the output signals of the layers of the CNN. When the estimator 650 is formed by a fully connected multilayer neural network, training of the CNN and training of the estimator 650 can simultaneously be performed using backpropagation, as in the arrangement shown in FIG. 8A.

In addition, the feature extraction unit 610 can extract the feature amount using another feature extraction method such as HOG or SIFT. Furthermore, the estimator can estimate the distribution using an identification function such as SVR, logistic regression, or a multilayer neural network. As described above, in an embodiment, an arbitrary combination of the feature extraction method and the estimation method can be used. In this case as well, training of the estimator can be performed in accordance with the conventional method. The parameters of the estimator obtained by the training in step S2200 are stored in the estimator storage unit 5200.

Figure 2A:
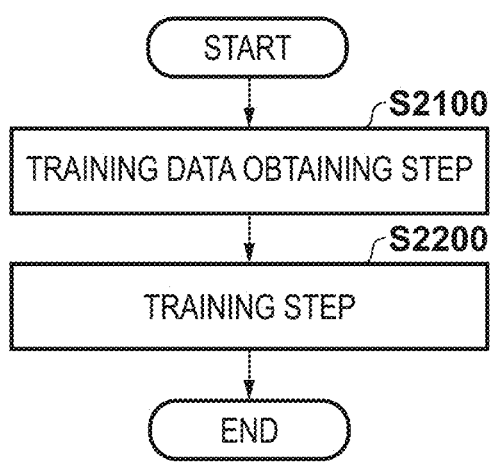
FIGS. 2A to 2G are flowcharts for explaining processing according to the embodiments.
Figure 2B:
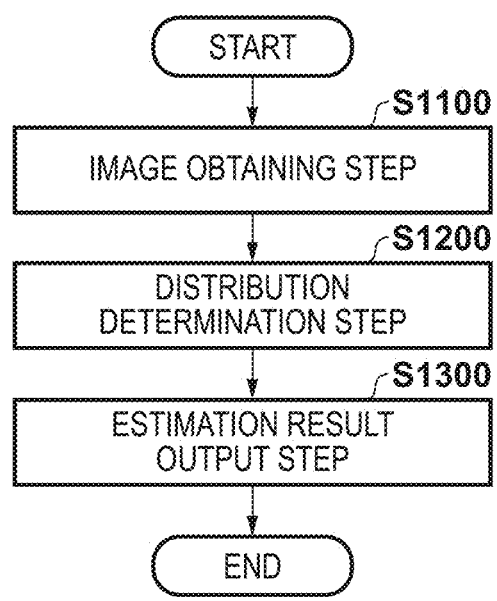

A method of identifying the distribution of an input image using the thus trained estimator will be described with reference to the flowchart of FIG. 2B. In step S1100, the image obtaining unit 1100 obtains an input image as a distribution identification target. The image obtaining unit 1100 can also obtain image data before development, which is obtained from an image capturing apparatus.

The image that is the distribution estimation target located in the predetermined region of the input image will be referred to as a target image hereinafter. The image obtaining unit 1100 can set a plurality of regions in the input image in accordance with a predetermined region setting pattern. A partial image of the input image included in each of the set regions is a target image. The target image is a partial image of a predetermined size according to the identification unit, and the setting method is not particularly limited. For example, as in the training, the input image can be segmented into a plurality of rectangular regions each having a predetermined size (for example, 16×16 pixels), and determination can be performed for a plurality of target images in the rectangular regions. On the other hand, determination may be performed for a target image in a partial region of the input image.

In step S1200, using the feature extraction unit 610, the estimation unit 1200 extracts a feature amount from the target image in the predetermined region of the input image obtained in step S1100. In addition, the estimation unit 1200 loads the trained estimator 620 from the estimator storage unit 5200 and inputs the feature amount to the estimator 620, thereby generating distribution-related information between regions of attributes different from each other in the target image. In this way, the estimation unit 1200 estimates the distribution for the target image in the input image obtained in step S1100. FIG. 8A shows an example of a CNN usable by the estimation unit 1200 for the processing. FIG. 8A shows a portion corresponding to processing performed by the feature extraction unit 610. Here, the signal in the predetermined region of the input image is forward-propagated to each layer, and a feature amount $X_i$ of the target image is extracted. In addition, FIG. 8A shows a portion corresponding to the estimator 620. Here, an output signal in an output element 621 assigned to each element of a distribution vector is generated from the obtained feature amount $X_i$. The value of the output signal of each element 1 becomes the value of each element $y_1(X_i)$ of the distribution vector.

In step S1300, the output unit 1300 outputs the estimation result obtained in step S1200. The processing performed by the output unit 1300 depends on the utilization method of the identification result and is not particularly limited. An example of processing using distribution-related information will be described below.

For example, image processing for each region of the input image can be changed in accordance with the distribution in the region. In this case, the output unit 1300 can output the distribution in each region to an image correction application.

Additionally, as another example, it is also possible to perform focus control of the camera according to the distribution. For example, a focus control apparatus for an image capturing apparatus having a plurality of focus detection points can include an obtaining unit and a control unit. For a region corresponding to each of a plurality of focus detection points in an image obtained by the image capturing apparatus, the obtaining unit obtains information representing the area ratio of a region of a specific attribute in the region. The control unit weights the plurality of focus detection points in accordance with the area ratio, and performs focus control of the image capturing apparatus. More specifically, when performing multipoint AF, the weight for a focus detection point where a more amount of an object component as a focusing target is included can be made large. For example, when performing focus control emphasizing the foreground, the weight for a focus detection point where a more amount of the foreground component is included can be made large. When performing focus control emphasizing a specific object, the weight for a focus detection point where a more amount of the specific object component is included can be made large. Such a focus control apparatus may obtain distribution-related information from the above-described information processing apparatus, may have the above-described components provided in the above-described information processing apparatus, or may obtain distribution-related information generated by a method different from this embodiment.

As still another example, it is also possible to perform exposure control of the camera according to the distribution. For example, an exposure control apparatus for an image capturing apparatus can include an obtaining unit, a calculation unit, a selection unit, and a control unit. For an image obtained by the image capturing apparatus and each region of the image, the obtaining unit can obtain information representing the area ratio of a region of a specific attribute in the region. The calculation unit can calculate the area ratio of the region of the specific attribute in the entire image. The selection unit can select an exposure control algorithm in accordance with the calculated area ratio. The control unit can perform exposure control of the image capturing apparatus using the selected exposure control algorithm. More specifically, when performing different exposure control in accordance with the area of the sky in the visual field, the area of the sky can be calculated based on the distribution. In this case, when most of the regions in which the sky and branches are mixed are determined as the foreground, or most of the regions are determined as the sky, as in the related art, it can be expected that the possibility that the area of the sky is greatly deviated from the actual value can be lowered.

A case in which still images are used as the training images and the input image has been explained here. However, moving images are also usable as the training images and the input image. In this case, the definition of the distribution is expanded in the time direction. For example, when a predetermined region of 16×16 pixels and five frames are defined as an identification unit, a distribution can be defined concerning a voxel of 16×16×5 pixels. For example, when the above-described example in which the distribution is expressed using the area ratio is expanded, the distribution can be expressed using a volume ratio.

In this embodiment, the input image (and the training images) is segmented into a plurality of regions each including a plurality of pixels, and the distribution in each region is estimated. According to such processing, since the number of times of estimation processing is smaller than in a case in which the class is estimated for each of all the pixels, the processing speed can be expected to be higher. On the other hand, it is also possible to estimate the distribution for each pixel of the input image. That is, one pixel sometimes includes a plurality of objects belonging to different classes, and the distribution of the object of each class in an object region corresponding to the one pixel can be estimated.

In this embodiment, the distribution-related information is obtained as a scalar value or a vector formed by a plurality of scalar values. On the other hand, the distribution-related information can be information selected from three or more values. For example, the distribution-related information of the classes "sky" and "non-sky" in a predetermined region can be a value representing that the predetermined region is formed by "sky", a value representing that the predetermined region is formed by "non-sky", or a value representing that "sky" and "non-sky" are mixed in the predetermined region. Such distribution-related information is also usable in the above-described example of processing and in the fourth and fifth embodiments to be described later.

Second Embodiment

In the first embodiment, the description has been made assuming that the class label is set for each pixel of a training image. However, setting the class label on a pixel basis is time-consuming. In the second embodiment, a method of reducing the user's work of inputting a class label for a training image will be described. In this embodiment, based on a class label input for each region of a training image, a data obtaining unit 2100 automatically calculates the class label of each pixel.

Figure 1C:
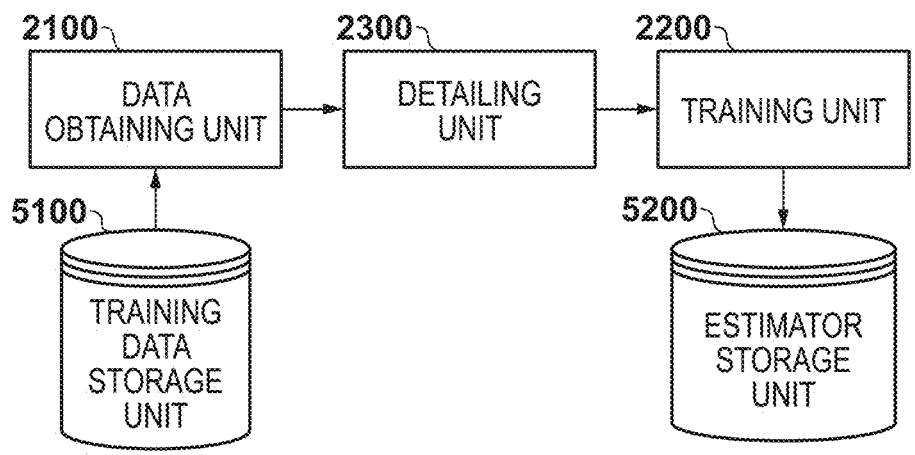

The basic arrangement of a training apparatus according to this embodiment will be described below with reference to FIG. 1C. The arrangement of an image processing apparatus according to this embodiment is the same as in the first embodiment, and a description thereof will be omitted. In this embodiment, in addition to an identified image, a training data storage unit 5100 stores pieces of information representing a region of a first attribute, a region of a second attribute, and a mixture region in which the region of the first attribute and the region of the second attribute are mixed in the identified image. For example, the training data storage unit 5100 stores training data including training images and a class label given to each region on the training images. Here, a region in which a plurality of classes are mixed is given a class label representing that the region is a mixture region.

The data obtaining unit 2100 loads the training data from the training data storage unit 5100. That is, the data obtaining unit 2100 obtains the pieces of information representing the region of the first attribute, the region of the second attribute, and the mixture region in which the region of the first attribute and the region of the second attribute are mixed in the identified image in addition to the identified image.

A detailing unit 2300 determines the attribute of each pixel of the mixture region based on the pixel values of pixels included in the region of the first attribute and the pixel values of pixels included in the region of the second attribute. For example, the detailing unit 2300 calculates supervisory information representing a distribution for a region given a class label representing that the region is a mixture region. Details will be described later. A training unit 2200 performs training of an estimator, as in the first embodiment, using the training images and the supervisory information of the distribution.

Figure 2C:
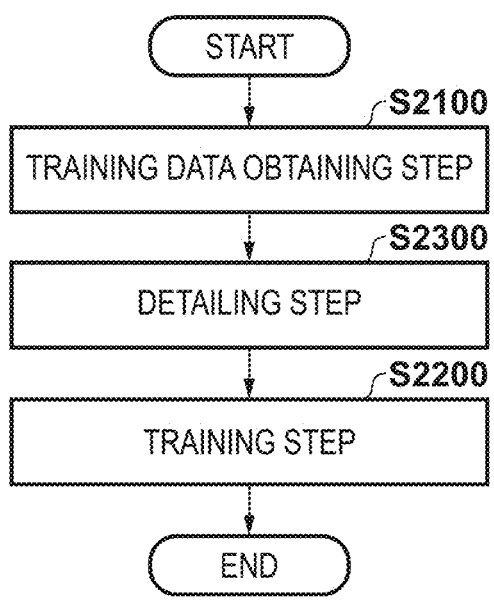

The procedure of processing performed by the training apparatus in this embodiment will be described with reference to FIG. 2C. In step S2100, the data obtaining unit 2100 loads training images and class label data from the training data storage unit 5100 as training data. A plurality of training images and class label data for the training images are prepared in advance in the training data storage unit 5100.

The class label data according to this embodiment will be described here. FIG. 9A shows a training image 500, and FIG. 9B shows class label data 400 for the training image 500. In this example, the training image 500 is formed by a sky region 410, a non-sky region 420, and a mixture region 430, and "sky", "non-sky", and "mixture" are given as class labels to the pixels of the regions, respectively. Regions of single classes and a region in which a plurality of classes are mixed are thus set for the training image 500.

These class labels can be input by a human in advance via a tool or the like. For example, an operator can decide the sky region and the non-sky region of the training image. At this time, a large work load is needed for the operator to correctly segment the sky region and the non-sky region in a portion including minute and complex branches of a tree in the foreground. Hence, the operator can give the class label "mixture" to such a region in which a plurality of classes are mixed.

The region in which "sky" and "non-sky" are mixed has been described here. However, the class definition is not limited to this, as described in the first embodiment. In addition, if the number of classes is three or more, the types of mixture regions can be set as many as the number of class combinations. For example, if three classes "sky", "plant", and "artifact" are defined as shown in FIG. 5, four types of mixture region classes "mixture region of sky and plant", "mixture region of sky and artifact", "mixture region of plant and artifact", and "mixture region of sky, plant, and artifact" can be defined. A description will be made below using an example in which two classes "sky" and "non-sky" are defined.

In step S2300, the detailing unit 2300 performs detailing of the class label concerning the mixture region. More specifically, the detailing unit 2300 sets a class label for each pixel in the mixture region. Here, the detailing unit 2300 determines the attribute of each pixel in the mixture region based on the pixel values of pixels included in the region of the first attribute and the pixel values of pixels included in the region of the second attribute. For example, the detailing unit 2300 can determine the class label of the mixture region by referring to the color information of each class. As a detailed example, for each of the sky region and the non-sky region in a training image $I_n$, the detailing unit 2300 extracts the RGB values of each pixel and plots the values in the RGB color space. The sky region and the non-sky region other than the mixture region are indicated by the training data. The detailing unit 2300 estimates a mixture Gaussian distribution for each of the sky region and the non-sky region. Then, it is possible to obtain the likelihood of the sky region based on the RGB values of each pixel in the mixture region and the mixture Gaussian distribution of the sky region and obtain the likelihood of the non-sky region based on the RGB values and the mixture Gaussian distribution of the non-sky region. The detailing unit 2300 can assign the class label of the higher likelihood of "sky" and "non-sky" to the pixel. In this way, the detailing unit 2300 can detail the class label in the mixture region. FIG. 9C shows thus detailed class level data 450, and a sky region 460 and a non-sky region 470 which are detailed are shown here.

Based on the thus detailed class label data, the detailing unit 2300 calculates supervisory information representing the distribution for an identified region as an identification unit. The identified region and the definition and the calculation method of the supervisory information representing the distribution are the same as described in detail in the first embodiment, and a detailed description thereof will be omitted here. Note that it is not essential that the detailing unit 2300 performs detailing of the class label. For example, it is possible to estimate the distribution in the mixture region based on the RGB value distribution of the pixels in the mixture region in the identified region and the mixture Gaussian distributions of the sky region and the non-sky region, and the supervisory information representing the distribution in the identified region may be calculated based on the distribution.

As a modification, in the training data, the distribution may be set for the region in which the plurality of classes are mixed. For example, the operator can input information representing the area ratio of a class such as "the ratio of the non-sky region is 30%" for a specific region. In this case, the detailing unit 2300 can calculate the supervisory information representing the distribution for the identified region as the identification unit without estimating the class label of each pixel. On the other hand, the detailing unit 2300 can also estimate the class label of each pixel of the input image by referring to the distribution. In this case, the estimation can be performed using an evaluation value that becomes high as the similarly between distribution-related information that can be calculated from training data and distribution-related information calculated based on the estimated attribute of each pixel becomes larger, as in the fifth embodiment to be described later.

Third Embodiment

In the first and second embodiments, the description has been made assuming that the identified region serving as the identification unit is set in advance as a rectangular region or a small region. On the other hand, the size of the identified region or how to cut it can be changed based on various kinds of capturing condition information. For example, in a strongly blurred region, a fine texture is lost as information. For this reason, the distribution estimation accuracy may be improved by performing estimation for a wider identified region.

The capturing condition information includes information unique to an image capturing apparatus and information unique to a captured image. As the information unique to the image capturing apparatus, the size or the allowable diameter of a circle of confusion of a sensor, the brightness or the focal length of an optical system, and the like are usable. As the information unique to the captured image, an aperture value, a focus distance, a By value, a RAW image, an exposure time, a gain (ISO sensitivity), a white balance coefficient, distance information, position information by a GPS, time information such as a date/time, and the like are usable. In addition, as the information unique to the captured image, a gravity sensor value, an acceleration, a geomagnetic direction, a temperature, a humidity, an atmospheric pressure, an altitude, and the like at the time of image capturing are also usable. There is also an image capturing system capable of obtaining information of infrared light or ultraviolet light in addition to visible light. Capturing condition information that can be obtained changes depending on the specifications of the image capturing apparatus. The capturing condition information can be information associated with an input image at the time of capturing of the input image, information representing the state of the image capturing apparatus at the time of capturing of the input image, or information measured by the image capturing apparatus at the time of capturing of the input image. In addition, the capturing condition information can be information representing the characteristic of the input image detected by the image capturing apparatus at the time of capturing of the input image. Furthermore, the capturing condition information is information different from the data of the input image itself.

Figure 1D:
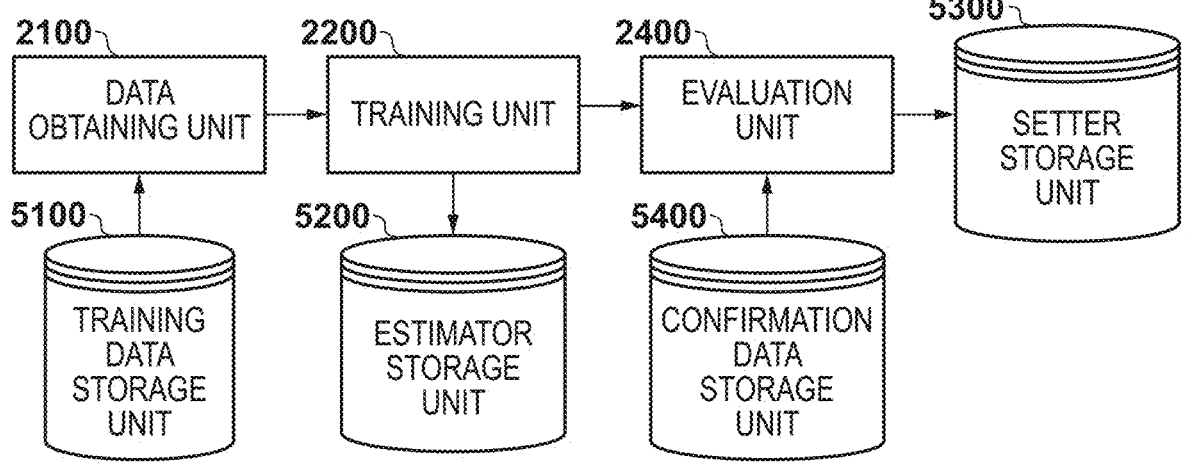

The basic arrangement of a training apparatus according to the third embodiment will be described with reference to FIG. 1D. A training data storage unit 5100 stores training data in advance. In this embodiment, the training data includes training images, capturing condition information corresponding to each training image, and supervisory information of distributions given to regions of various sizes on the training images. A data obtaining unit 2100 loads the training images, the capturing condition information, and the supervisory information from the training data storage unit 5100. A training unit 2200 performs training of an estimator that estimates the distribution using the training images and the supervisory information of the distributions, and stores the obtained estimator in an estimator storage unit 5200. Here, the training unit 2200 generates a first estimator by training using an identified image in a predetermined region set in accordance with a first region setting pattern and generates a second estimator by training using an identified image in a predetermined region set in accordance with a second region setting pattern. An evaluation unit 2400 evaluates the estimation accuracy of each estimator obtained by training using confirmation data loaded from a confirmation data storage unit 5400. The evaluation unit 2400 then generates a region setter based on the capturing condition information and the estimation accuracy and stores it in a setter storage unit 5300.

Figure 1E:
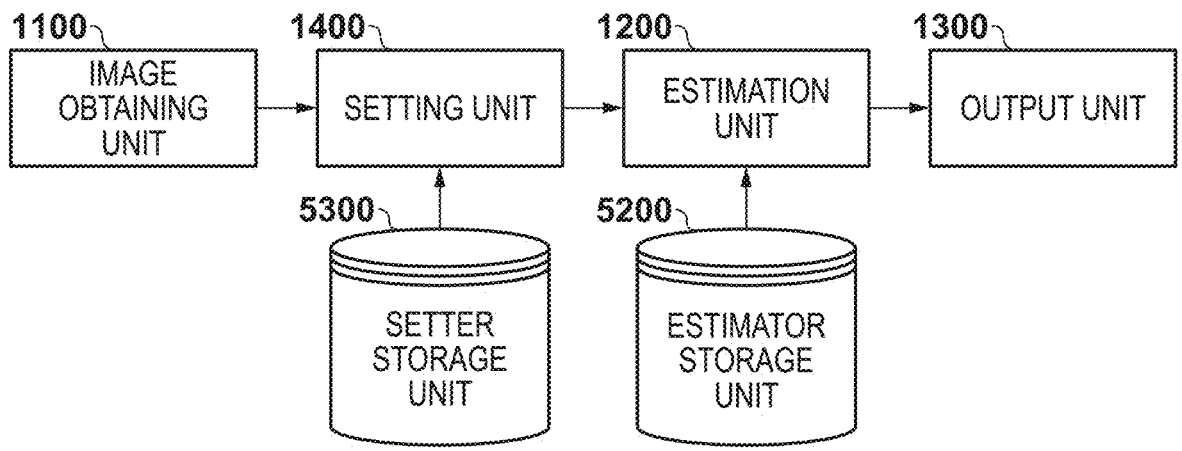

The outline of the device arrangement of an image processing apparatus will be described next with reference to FIG. 1E. An image obtaining unit 1100 obtains an input image and capturing condition information. A region setting unit 1400 selects a region setting pattern to be used to set a target image from a plurality of region setting patterns in accordance with the capturing condition information. In this embodiment, the region setting unit 1400 loads the region setter from the setter storage unit 5300 and sets a region serving as an identification unit in accordance with the capturing condition information. An estimation unit 1200 loads the estimator from the estimator storage unit 5200 and estimates the distribution using the estimator for a target image in a predetermined region set in accordance with the set identification unit.

Figure 2D:
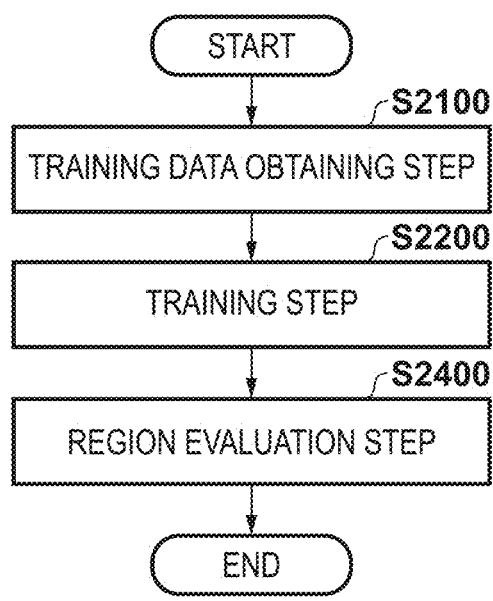

A detailed description of processing according to this embodiment will be made below. Processing at the time of training will be described first with reference to the flowchart of FIG. 2D. In step S2100, the data obtaining unit 2100 loads training images, capturing condition information, and supervisory information of distributions from the training data storage unit 5100 as training data.

In step S2200, using the training images and the supervisory information of distributions obtained by the data obtaining unit 2100, the training unit 2200 performs training of the estimator that estimates the distribution. As described above, in this embodiment, an identification unit is set in accordance with each of a plurality of types of region setting patterns. That is, various regions are prepared as the region serving as the identification unit. For example, identification units of a plurality of patterns with different sizes such as rectangular regions of 3×3 pixels, 9×9 pixels, and 15×15 pixels can be prepared. As described in the first embodiment as well, the identification unit is not limited to a rectangular region. For example, as described in the first embodiment, a plurality of parameters to be used when setting a small region by region segmentation can be prepared as the plurality of region setting patterns.

Figure 3C:
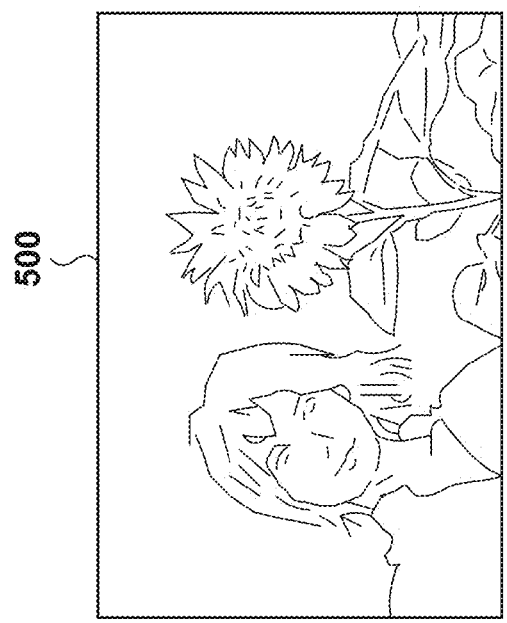

Depending on the difference in the region setting pattern, the supervisory information of the distribution can change even at the same position on the image. FIG. 3C shows rectangular regions 551, 552, and 553 of various sizes at the same position of a training image. In the smallest rectangular region 551, the area ratio of sky:non-sky is r=1. On the other hand, each of the rectangular regions 552 and 553 includes a non-sky region, and the area ratios are r=0.9 and r=0.8, respectively.

The training unit 2200 performs training of the estimator corresponding to each region setting pattern. That is, the training unit 2200 performs training of the estimator corresponding to a region setting pattern of interest based on the identified region set in accordance with the region setting pattern of interest and the supervisory information given for the identified region. As a result, the training unit 2200 generates an estimator corresponding to each of the plurality of region setting patterns. For example, letting q be the index of a region setting pattern, and Q be the total number of region setting patterns, Q types of estimators yq can be obtained by training. Training of the estimator can be done as in the first embodiment. As an example, each estimator yq can estimate the distribution in accordance with a regression function fq(X) (q=1, . . . , Q). The estimator obtained by training is stored in the estimator storage unit 5200.

In step S2400, the evaluation unit 2400 evaluates the identification accuracy of the estimator obtained in step S2200 together with the capturing condition information and generates a region setter. For example, the evaluation unit 2400 can evaluate the identification accuracy of each estimator using a verification image with which the supervisory information and the capturing condition information are associated. The evaluation unit 2400 can generate information representing an estimator corresponding to specific capturing condition information such that a satisfactory identification accuracy can be obtained when determining an identified image with which predetermined capturing condition information is associated.

The pieces of capturing condition information include information that can be obtained for each pixel of the training image. In addition, new capturing condition information can be generated by combining the pieces of capturing condition information. For example, when a distance Z(p) from the lens surface to an object at a pixel position p and a focal length f of the optical system are obtained as the capturing condition information, an image magnification S(p) can be calculated.

$$S(p) = \frac{f}{Z(p)}$$

In addition, when the f-number of the optical system, the focal length f, the focus distance $Z_f$ at the time of image capturing, and the distance Z(p) up to the object at the pixel position p are obtained as the capturing condition information, a blur amount B(p) at each pixel position can be obtained.

$$B(p) = \frac{f^2|Z(p) - Z_f|}{FZ_f(Z(p) - f)}$$

Furthermore, when values r(p), g(p), and b(p) at each pixel position p of a RAW image, an exposure time T, a gain G, and an aperture amount F are obtained as the capturing condition information, the absolute value of an incident light amount BV(p) at the pixel position D can be obtained.

$$BV(p) = \log_2 \frac{F^2(0.3r(p) + 0.6g(p) + 0.1b(p))}{0.3GT}$$

A case in which the region setter is generated using the blur amount B(p) at the pixel position p as the capturing condition information will be described below. However, the capturing condition information to be used is not limited to this, and another capturing condition information such as the image magnification S(p) or the incident light amount BV(p) may be used. In addition, a plurality of pieces of capturing condition information may be combined. For example, the blur amount B(p) and the incident light amount BV(p) may be used in combination.

First, the evaluation unit 2400 divides the blur amount B into a plurality of bins and generates a table concerning the region setting pattern q. In this example, the table is divided into four bins in which the blur amount B is less than 2, ranges from 2 (inclusive) to 3 (exclusive), ranges from 3 (inclusive) to 4 (exclusive), and is more than 4. In addition, as the region setting pattern q, three types of region setting patterns of 3×3 pixels, 9×9 pixels, and 15×15 pixels are used. A 3×4 table can be obtained.

Next, the evaluation unit 2400 loads confirmation data from the confirmation data storage unit 5400. The confirmation data includes a plurality of confirmation images, class label data for each confirmation image, and capturing condition information, like the training data. Here, the total number of confirmation images is represented by $N_v$, and the with confirmation image is represented by Iv (v=1, . . . $N_v$).

The evaluation unit 2400 extracts the feature amount of a region i serving as the identification unit in the confirmation image in accordance with each of the region setting patterns q, and inputs the feature amount to the corresponding estimator. An estimated value $y_q(X^v_i)$ of the distribution in the region i of the confirmation image Iv in a case in which the region setting pattern q is used can thus be obtained. At this time, a square error for distribution supervisory information $c_q(v, i)$ can be expressed as $$Err_{v,q}(i) = (y_q(X^v_i) - c_q(v,i))^2$$

In addition, a mean square error MSE(B, q) in a bin (B, q) for the combination of the blur amount B and the region setting pattern q is expressed as $$MSE(B, q) = \frac{\sum_v \sum_i \delta_B(v, i) Err_{v,q}(i)}{\sum_v \sum_i \delta_B(v, i)}$$

wherein $\delta_B(v, i)$ returns 1 when the blur amount at the central position of the region i of the confirmation image Iv falls within the range of the bin B, and returns 0 otherwise.

A reliability T(B, q) concerning the bin (B, q) can be defined as a value obtained by subtracting the root mean square from 1.

$$T(B,q) = 1 - \sqrt{MSE(B,q)}$$

In this way, the evaluation unit 2400 can obtain the table of the reliability T(B, q) for each bin (B, q). An example of a thus obtained table is shown below. The evaluation unit 2400 stores the thus obtained table as a region setter in the setter storage unit 5300.

TABLE 1

| | | Blur amount B(p) [pix] | | |
|---|---|---|---|---|
| | B(p) < 2 | 2 ≤ B(p) < 3 | 3 ≤ B(p) < 4 | 4 ≤ B(p) |
| Region size q | 3 × 3   0.9 | 0.8 | 0.3 | 0.2 |
| | 9 × 9   0.6 | 0.5 | 0.8 | 0.5 |
| | 15 × 15   0.4 | 0.3 | 0.5 | 0.7 |

In this embodiment, the obtained table is stored as the region setter in the setter storage unit 5300. On the other hand, using the value of the reliability T(B, q) as supervisory information, the evaluation unit 2400 may generate a regression function $g_q(B)$ that outputs the reliability T for the blur amount B as a regression value for each region setting pattern q and use it as the region setter.

Figure 2E:
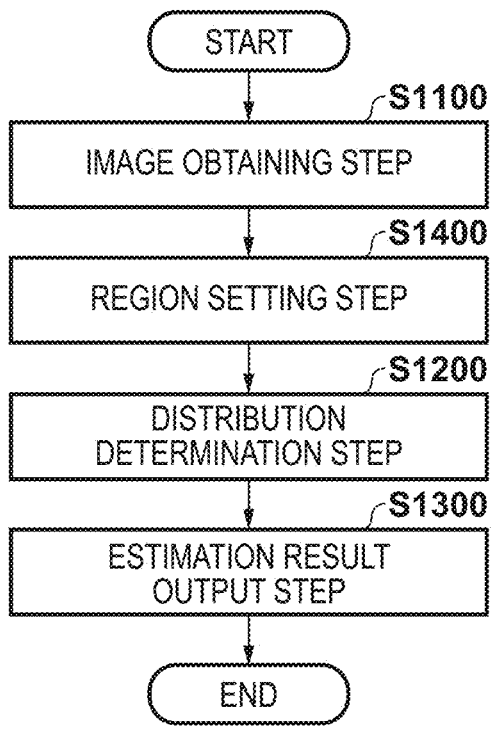

Processing of estimating the distribution of the input image using the distribution estimator and the region setter which are obtained in the above-described way will be described with reference to the flowchart of FIG. 2E. In step S1100, the image obtaining unit 1100 obtains image data obtained by the image capturing apparatus and capturing condition information.

In step S1400, the region setting unit 1400 loads the region setter from the setter storage unit 5300 and decides the region setting pattern to be used in accordance with the capturing condition information. For example, the region setting unit 1400 can select a region setting pattern $q_{win}$ that maximizes the reliability T obtained from the blur amount B(i) obtained as the capturing condition information for each region i of the input image I in accordance with the following equation. Note that the blur amount B(i) represents the blur amount at the central position of the region i of the input image I. Detailed processing is not particularly limited. For example, this fragmentation can be performed in a case in which the reliability becomes high when the input image I is segmented into a plurality of regions in accordance with one region setting pattern, and one region is fragmented in accordance with another region setting pattern. As another example, regions of similar blur amounts are connected. Region segmentation can be performed using a region setting pattern according to the blur amount for each connected region.

$$q_{win}(i) = \underset{q}{\mathrm{argmax}} T(B(i), q)$$

Figure 3D:
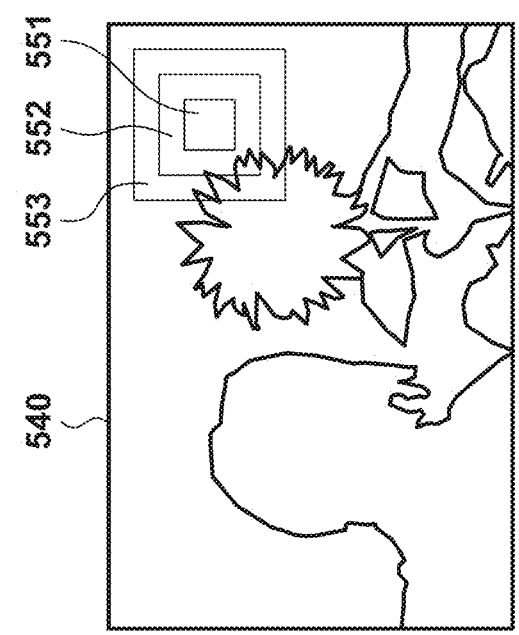

In step S1200, the estimation unit 1200 loads the estimator from the estimator storage unit 5200, and estimates the distribution at each position of the input image. More specifically, the estimation unit 1200 extracts the feature amount of the image of a predetermined region set at each position p and inputs the extracted feature amount to the estimator, thereby estimating the distribution at the position p. Here, the predetermined region at each position p is set in accordance with the region setting pattern $q_{win}$ decided in step S1400. As described above, in this embodiment, an estimator corresponding to each of a plurality of region setting patterns is generated. Hence, the estimation unit 1200 can use the estimator selected from the plurality of estimators in accordance with the region setting pattern decided in step S1400. For example, as the estimator at the position p, $y_{qwin}$ is selected. The estimated value of the distribution in the predetermined region at the position p is obtained as $y_{qwin}(X_i)$. FIG. 3D shows an example in a case in which the region setting method is changed depending on the position on the image. Each rectangle indicates one region input to the estimator.

The process of step S1300 is the same as in the first embodiment, and a description thereof will be omitted. When the method of setting the region serving as the identification unit to estimate the distribution using the capturing condition information is changed, as in this embodiment, the distribution can be estimated with a reduced error.

Fourth Embodiment

In the first to third embodiments, the distribution in the predetermined region serving as the identification unit is estimated. In the fourth embodiment, a method of obtaining a detailed region segmentation result by fragmenting a region using an obtained distribution estimation result will be described. The basic arrangements of a training apparatus and an image processing apparatus are the same as in the first embodiment, and a description thereof will be omitted.

Processing at the time of training will be described below with reference to the flowchart of FIG. 2A. In step S2100, a data obtaining unit 2100 loads a training image and supervisory information of a distribution from a training data storage unit 5100 as training data.

In step S2200, a training unit 2200 performs the same processing as in the third embodiment. That is, regions of various sizes are prepared as identification units. For example, a plurality of patterns of rectangular regions of different sizes such as 1×1 pixel, 3×3 pixels, 9×9 pixels, and 15×15 pixels can be prepared in accordance with a plurality of region setting patterns. The training unit 2200 can perform training of an estimator corresponding to each region size using the supervisory information of the distribution obtained for each region size, as in the third embodiment. That is, let q be the index of the region size, and Q be the total number of region sizes. Then, Q types of estimators yq (q=1, . . . , Q) can be obtained by training. As an example, each estimator yq can estimate the distribution in accordance with a regression function fq(X). The estimator yq obtained by the training is written in an estimator storage unit 5200.

Figure 2F:
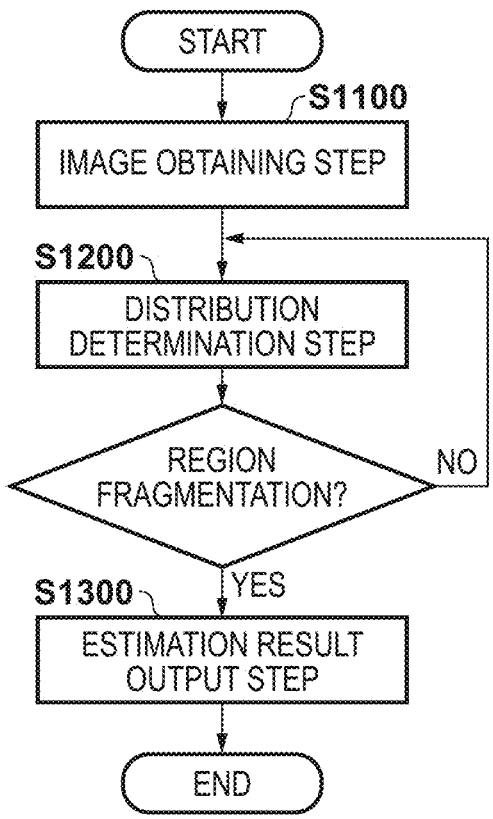

Processing at the time of determination will be described next with reference to the flowchart of FIG. 2F. In step S1100, an image obtaining unit 1100 obtains an input image. In step S1200, an estimation unit 1200 estimates a distribution in a predetermined region in the input image using an estimator. Here, the estimation unit 1200 performs region setting using a first region setting pattern of a plurality of region setting patterns. That is, the estimation unit 1200 determines the distribution for a first target image having a size according to the first region setting pattern. In this embodiment, the largest size of the Q types of region sizes is used as the identification unit. In the above-described example, a region of 15×15 pixels is selected as the identification unit, and an estimator corresponding to 15×15 pixels is used as the estimator.

The estimation unit 1200 determines, in accordance with information representing the estimated distribution for the first target image located in a first portion of the input image, whether to re-determine the distribution of the first portion. For example, the estimation unit 1200 determines whether to re-determine the distribution for the predetermined region for which the distribution is estimated. For example, for a region whose class purity is equal to or more than a threshold, the estimation unit 1200 employs the class estimation result.

On the other hand, for a region whose class purity is less than the threshold, the estimation unit 1200 re-determines the distribution in this region. According to the determination to perform re-determination, the estimation unit 1200 outputs the distribution-related information of a second target image having a size according to a second region setting pattern in the first portion. Here, the second target image is smaller than the first target image. That is, for a region whose class purity is less than the threshold, the estimation unit 1200 re-segments the region in accordance with a smaller identification unit, and estimates the distribution using an estimator again for each of the re-segmented regions. The estimation unit 1200 can perform the re-segmentation using a region size smaller by one step. As described above, in this embodiment, an estimator corresponding to each of the plurality of region setting patterns is generated. Hence, the estimation unit 1200 can use an estimator selected from the plurality of estimators in accordance with the region setting pattern used for re-segmentation.

Here, the class purity indicate the ratio of pixels in a region to which the same class label is assigned. For example, if the value of the area ratio r shown in the first embodiment is 0.8 or more or 0.2 or less, it can be defined that the class purity is high. When the map shown in FIG. 7 is used, it can be defined that the class purity is high in a case in which p1≥0.9 and p2≤0.8.

As described above, fragmentation and distribution re-estimation are performed for a region with a low class purity, thereby performing detailed region segmentation. If the region cannot be fragmented, or the class purities of all regions become equal to or more than the threshold, the process can advance to step S1300. The process of step S1300 is the same as in the first embodiment, and a description thereof will be omitted. The thus obtained detailed region segmentation result can be used for image quality enhancement processing such as tone mapping or white balance adjustment for each region.

Fifth Embodiment

In the fourth embodiment, a detailed region segmentation result is calculated by fragmenting the identification unit. However, the region segmentation method is not limited to this. In the fifth embodiment, a method of obtaining a detailed region segmentation result by performing class determination on a pixel basis using a distribution estimation result for each region will be described.

Figure 1F:
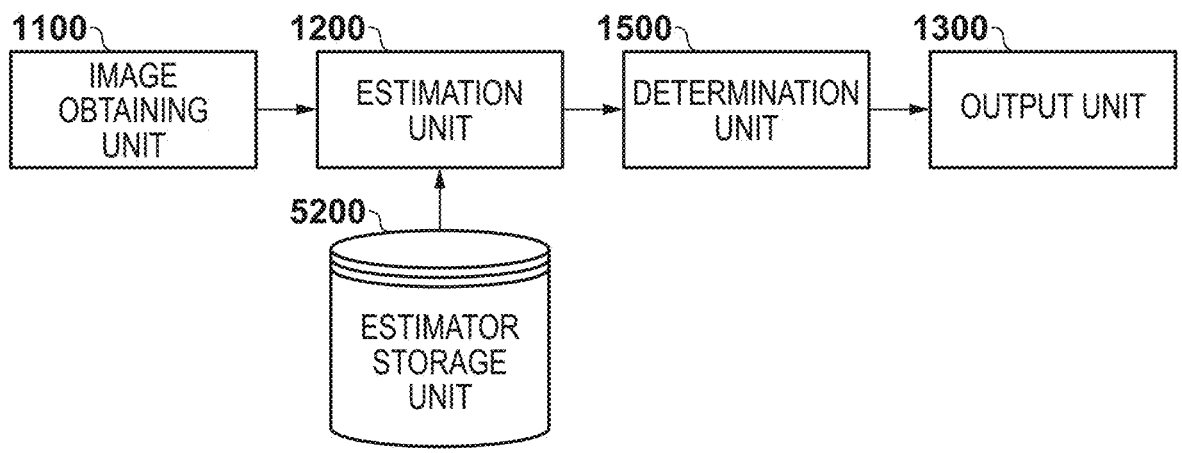

FIG. 1F shows the basic arrangement of an image processing apparatus according to this embodiment. The functions of an image obtaining unit 1100 and an estimation unit 1200 are the same as in the first embodiment, and a description thereof will be omitted. A determination unit 1500 decides the attribute of each pixel of the target image. The determination unit 1500 decides the attribute of each pixel based on an evaluation value. The larger the similarity between distribution-related information calculated based on the attribute of each pixel and distribution-related information obtained by the estimation unit 1200 is, the larger the evaluation represented by the evaluation value is. In this embodiment, the determination unit 1500 estimates the class label of each pixel of an input image based on a distribution estimation result and image information. An output unit 1300 outputs information representing the class label estimated for each pixel of the input image.

Figure 2G:
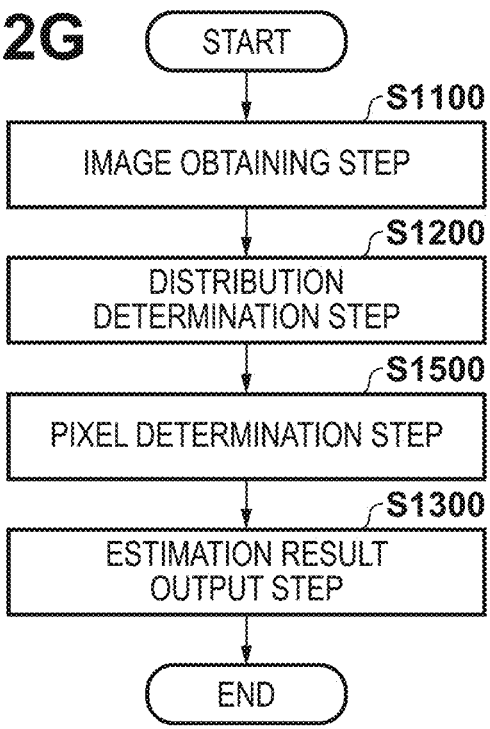

Details of determination processing according to this embodiment will be described with reference to FIG. 2G. The processes of steps S1100 and S1200 are the same as in the first embodiment, and a description thereof will be omitted. In step S1500, the determination unit 1500 estimates the class for each pixel of the input image using the distribution of each region estimated in step S1200. For example, estimation of the class of each pixel can be performed such that the distribution obtained in accordance with the estimated class of each pixel becomes close to the distribution estimated in step S1200. In addition, estimation of the class of each pixel can be performed using the color information of each pixel such that, for example, the colors of pixels belonging to the same class become similar, or the colors of pixels belonging to different classes do not become similar.

As an example of the method of estimating the class of each pixel of the input image, a case in which iterative processing such as CRF (Conditional Random Field) is used will be described below. CRF is a method of sequentially transitioning the state of each node to a stable state in consideration of a pairwise potential based on the similarity between a pair of nodes and a unary potential held by each node for a graph formed by a plurality of nodes. When the CRF is used for pixel determination of an image, a CRF model in which each node corresponds to each pixel of the image can be used.

The conditional probability of a class label ci of a pixel i on an input image I can be given by $$\log P(c_i \mid I, \theta_\varphi, \theta_\phi) = \varphi_i(c_i, I; \theta_\varphi) + \sum_{j \in \varepsilon_i} \phi(c_i, c_j, g_{ij}(I); \theta_\phi) - \log Z(\theta, I)$$

where φ of the first term on the right side indicates the unary potential, and ϕ of the second term on the right side indicates the pairwise potential. θφ and θϕ are parameters and calculated in training processing to be described later. $\varepsilon_i$ is the set of pixels near the pixel i, $g_{ij}$ is a function representing the correlation between the pixel i and a pixel j, and Z is a normalized term. The determination unit 1500 updates the class label of each pixel in accordance with the model formula, thereby converging the determination result to a state which the potential of the entire image is high.

The pairwise potential can be expressed as $$g_{ij}(I) = \exp(-\beta \|x_i - x_j\|^2)$$

$$\phi(c_i, c_j, g_{ij}(I); \theta_\phi) = -\theta_\phi^T g_{ij}(I) \delta(c_i \neq c_j)$$

where $x_i$ and $x_j$ are the pieces of color information of the pixels i and j, respectively, and are represented by three-dimensional vectors having RGB values. β is a hyper parameter defined by the user, and β=1 or the like can be set. In this way, the pairwise potential can be set such that the evaluation becomes low in a case in which the colors of pixels belonging to different classes are similar at time t.

The unary potential can be expressed as $$\varphi_i(c_i,I;\theta_\varphi)=\|y_c(X_i)-L_c^i(t)\| \quad 5$$

where $y_c(X_i)$ is a distribution estimated value concerning a class c at a pixel position i. The value $y_c(X_i)$ can be calculated based on the distribution estimated by the estimation unit 1200 for a predetermined region including the pixel position i, and can be, for example, the area ratio, the edge pixel ratio, the class label arrangement pattern, or the like of the class c in the predetermined region. As described above, as for the unary potential, the larger the similarity between the distribution calculated based on the attribute of each pixel and the distribution obtained by the estimation unit 1200 at the time t is, the larger the evaluation is.

$L_c^i(t)$ is the distribution of the class c in the predetermined region including the pixel i at the time t when the class label on the pixel basis transitions in accordance with the CRF. $L_c^i(t)$ is information of the same type as the distribution estimated by the estimation unit 1200 and can be calculated by referring to the class estimated by the estimation unit 1200 for each pixel in the predetermined region at the time t. A detailed example will be described below in accordance with the example of the distribution explained in the first embodiment. For example, at the time t halfway through the transition, pixels to which the class label c is assigned in the predetermined region including the pixel i are counted, thereby obtaining an area ratio r(t) of the class c. In addition, edge pixels are extracted and counted in accordance with the arrangement of the class label in the predetermined region, thereby obtaining an edge pixel ratio e(t). Furthermore, as for the arrangement of the class label in the predetermined region, which map shown in FIG. 7 is closest to the class label is determined, thereby obtaining a class label arrangement pattern p(t). As described in the first embodiment, $L_c^i(t)$ can also be represented by the combination of distributions at the time t.

As described above, the similarity between the distribution estimated value for the predetermined region and the distribution in the predetermined region at the time t decided based on the class label arrangement at the pixel level at the time t during the transition can be expressed as the unary potential. More specifically, the unary potential can be expressed such that the higher the evaluation is, the larger the similarity between distribution in the predetermined region at the time t and the distribution estimated value for the predetermined region is.

Training processing according to this embodiment will be described with reference to FIG. 2A. In step S2100, a data obtaining unit 2100 obtains a training image and supervisory data. In step S2200, a training unit 2200 performs training of an estimator, as in the first embodiment. In addition, the training unit 2200 decides the values of parameters (for example, θφ and θϕ described above) used when estimating the class of each pixel of the input image. The training unit 2200 can perform this processing using a plurality of training images and data of a class label representing the class of each pixel of the training images. As the data of the class label, for example, data created as shown in FIG. 9C according to the second embodiment can be used. In this embodiment, the training unit 2200 can calculates the values of θφ and θϕ such that the potential for the all training images becomes maximum. That is, the values of θφ and θϕ that respectively maximize $$\sum_n \sum_i \varphi_i(c_i, I_n; \theta_\varphi)$$

$$\sum_n \sum_i \sum_{j \in \varepsilon_i} \phi(c_i, c_j, g_{ij}(I); \theta_\phi)$$

can be obtained by a gradient method or the like.

The training unit 2200 stores the obtained parameters in an estimator storage unit 5200 together with the estimator. In this embodiment, the values of θφ and θϕ are stored in the estimator storage unit 5200 and used by the determination unit 1500 in the above-described way. The thus obtained data of the class label of each pixel can be used when, for example, performing image quality enhancement processing for each region, as in the fourth embodiment.

The method of determining the class of each pixel using the distribution estimation result is not limited to the above-described method. For example, class determination for each pixel can be performed based on the mixture Gaussian distribution of each class obtained using a region whose class is determined and the above-described similarity of distributions, as in the second embodiment.

The processing according to this embodiment can be performed using any one of the area ratio, the edge pixel ratio, and the class label arrangement pattern as the distribution, and usable distributions are not limited to these. In addition, when a distribution expressed by combining a plurality of expressions is used, the determination accuracy can be improved. For example, when the edge pixel ratio is used in addition to the area ratio, a case in which the contour is simple like the boundary between a building and the sky and a case in which the contour is complex like the boundary between branches and the sky can be discriminated.

In this embodiment, distribution-related information is obtained by the processing of the estimation unit 1200. However, the determination unit 1500 may obtain distribution-related information obtained by a different method and determine the attribute of each pixel by the same method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-132259, filed Jul. 5, 2017, which is hereby incorporated by reference herein in its entirety.

What is claimed is:

1. An image processing apparatus comprising:
an estimator which has been trained based on (a) a feature extracted from a training image and (b) supervisory information, the supervisory information representing an area ratio of regions belonging to different classes in the training image; and
one or more processors,
wherein the one or more processors function as the following units:
(1) an obtaining unit configured to obtain a target image in which a plurality of regions belonging to different classes are mixed;
(2) an extraction unit configured to extract a feature from the target image; and
(3) an estimation unit configured to estimate a state of mixture of the plurality of regions belonging to different classes in the target image based on an output from the estimator in response to inputting the feature extracted from the target image into the estimator,
wherein the state of mixture estimated by the estimation unit indicates an area ratio of the plurality of regions.

2. The apparatus according to claim 1, wherein the one or more processors further function as an output unit configured to output state of mixture information which represents the state of mixture of the plurality of regions.

3. The apparatus according to claim 2, wherein the state of mixture information is information representing a ratio of (1) the number of pixels of a specific region among the plurality of regions to (2) the number of all pixels of the target image.

4. The apparatus according to claim 2, wherein the state of mixture information is information concerning a boundary between the plurality of regions in the target image.

5. The apparatus according to claim 4, wherein the information concerning the boundary between the plurality of regions in the target image is information representing a ratio of pixels representing the boundary between the plurality of regions.

6. The apparatus according to claim 1, wherein the one or more processors further function as a setting unit configured to set regions in an input image in accordance with a region setting pattern,
wherein the target image is a partial image of the input image included in each of the set regions.

7. The apparatus according to claim 6, wherein the obtaining unit is further configured to obtain capturing condition information of the input image, and
wherein the setting unit selects the region setting pattern in accordance with the capturing condition information.

8. The apparatus according to claim 6, wherein the one or more processors further function as a determination unit configured to determine, in accordance with a state of mixture of regions in a first target image located in a first portion of the input image and having a size according to a first region setting pattern, whether to re-determine the state of mixture of the first portion,
wherein the estimation unit is further configured to estimate, in response to the determination to perform re-determination, a state of mixture in a second target image located in the first portion and having a size according to a second region setting pattern, and
wherein the second target image is smaller than the first target image.

9. The apparatus according to claim 6, wherein the estimation unit is further configured to use, for estimation, an estimator selected from a plurality of estimators in accordance with the region setting pattern.

10. A training apparatus comprising one or more processors, wherein the one or more processors function as the following units:
(1) a first obtaining unit configured to obtain an identified image for training of an estimator, wherein a plurality of regions belonging to different classes are mixed in the identified image;
(2) an extraction unit configured to extract a feature from the plurality of regions;
(3) a second obtaining unit configured to obtain, as supervisory information, state of mixture information which represents an area ratio of the plurality of regions belonging to different classes in the identified image; and
(4) a training unit configured to perform the training of the estimator using a combination of the feature and the supervisory information,
wherein the estimator is trained to estimate the area ratio of the identified image from the feature.

11. The apparatus according to claim 10, wherein the second obtaining unit is further configured to obtain information representing an attribute of each pixel of the identified image and to generate the state of mixture information using the information representing the attribute of each pixel, thereby obtaining the supervisory information.

12. The apparatus according to claim 10, wherein the identified image is an image at a region among a plurality of regions set in a training image.

13. The apparatus according to claim 10, wherein the estimator is configured to estimate the area ratio using a Convolutional Neural Network.

14. An image processing method comprising:
obtaining a target image in which a plurality of regions belonging to different classes are mixed;
extracting a feature from the target image; and
estimating a state of mixture of the plurality of regions belonging to different classes in the target image based on an output from an estimator in response to inputting the feature extracted from the target image into the estimator, the estimator having been trained based on (a) a feature extracted from a training image and (b) supervisory information, the supervisory information representing an area ratio of regions belonging to different classes in the training image,
wherein the state of mixture indicates an area ratio of the plurality of regions.

15. A training method comprising:
obtaining an identified image for training of an estimator, wherein a plurality of regions belonging to different classes are mixed in the identified image;

extracting a feature from the plurality of regions;
obtaining, as supervisory information, state of mixture information which represents an area ratio of the plurality of regions belonging to different classes in the identified image; and
performing the training of the estimator using a combination of the feature and the supervisory information,
wherein the estimator is trained to estimate the area ratio of the identified image from the feature.

16. A non-transitory computer-readable medium storing a program which causes a computer having a processor and a memory to:
obtain a target image in which a plurality of regions belonging to different classes are mixed;
extract a feature from the target image; and
estimate a state of mixture of the plurality of regions belonging to different classes in the target image based on an output from an estimator in response to inputting the feature extracted from the target image into the estimator, the estimator having been trained based on (a) a feature extracted from a training image and (b) supervisory information, the supervisory information representing an area ratio of regions belonging to different classes in the training image,
wherein the state of mixture indicates an area ratio of the plurality of regions.

17. A non-transitory computer-readable medium storing a program which causes a computer having a processor and a memory to:
obtain an identified image for training of an estimator, wherein a plurality of regions belonging to different classes are mixed in the identified image;
extract a feature from the plurality of regions;
obtain, as supervisory information, state of mixture information which represents an area ratio of the plurality of regions belonging to different classes in the identified image; and
perform the training of the estimator using a combination of the feature and the supervisory information,
wherein the estimator is trained to estimate the area ratio of the identified image from the feature.

* * * * *